(12) United States Patent
Cardarelli

(10) Patent No.: US 8,079,259 B2
(45) Date of Patent: *Dec. 20, 2011

(54) MEMS GYROSCOPE WITH OUTPUT OSCILLATION ABOUT THE NORMAL TO THE PLANE

(75) Inventor: Donato Cardarelli, Medfield, MA (US)

(73) Assignee: Milli Sensor Systems & Actuators, West Newton, MA (US)

( * ) Notice: Subject to any disclaimer, the term of this patent is extended or adjusted under 35 U.S.C. 154(b) by 605 days.

This patent is subject to a terminal disclaimer.

(21) Appl. No.: 12/185,626

(22) Filed: Aug. 4, 2008

(65) Prior Publication Data

US 2009/0019932 A1    Jan. 22, 2009

Related U.S. Application Data

(63) Continuation-in-part of application No. 11/426,368, filed on Jun. 26, 2006, now Pat. No. 7,406,867.

(51) Int. Cl.
*G01P 9/04* (2006.01)
(52) U.S. Cl. .................... 73/504.13; 73/504.12
(58) Field of Classification Search ............ 73/504.13, 73/504.04, 504.14, 504.15, 504.02
See application file for complete search history.

(56) References Cited

U.S. PATENT DOCUMENTS

| | | | |
|---|---|---|---|
| 4,179,818 A | 12/1979 | Craig | |
| 5,359,893 A * | 11/1994 | Dunn | 73/504.12 |
| 5,889,207 A | 3/1999 | Lutz | |
| 5,992,233 A | 11/1999 | Clark | |
| 6,244,111 B1 | 6/2001 | Funk | |
| 6,250,158 B1 | 6/2001 | Stewart | |
| 6,343,509 B1 | 2/2002 | Fell et al. | |
| 6,481,285 B1 | 11/2002 | Shkel et al. | |
| 6,513,380 B2 * | 2/2003 | Reeds et al. | 73/504.12 |
| 6,928,874 B2 | 8/2005 | Painter et al. | |
| 7,040,162 B2 | 5/2006 | Lehrueau et al. | |
| 7,100,446 B1 | 9/2006 | Acar et al. | |
| 7,617,728 B2 * | 11/2009 | Cardarelli | 73/504.16 |

OTHER PUBLICATIONS

Pitman, G.R., Jr., Inertial Guidance, University of California Engineering and Physical Sciences Extension Series, J. Wiley and Sons, Inc., New York, 1962, J.S. Ausman, ch.3.

* cited by examiner

*Primary Examiner* — Helen C. Kwok
(74) *Attorney, Agent, or Firm* — Brian M. Dingman; Mirick, O'Connell, DeMallie & Lougee, LLP

(57) ABSTRACT

A gyroscope that lies generally in a plane, for detecting rotation rate about a gyro input axis. The gyroscope has a substrate, and a generally planar outer member flexibly coupled to the substrate such that it is capable of oscillatory motion about a drive axis that is orthogonal to the input axis. There is also a generally planar inner member coplanar with and flexibly coupled to the outer member such that it is capable of rotary oscillatory motion relative to the outer member about an output axis that is orthogonal to the plane of the members. There are one or more drives for directly or indirectly oscillating the outer member about the drive axis, and one or more sensors that detect oscillation of the inner member about the output axis.

36 Claims, 16 Drawing Sheets

MEMS GYROSCOPE WITH OUTPUT OSCILLATION ABOUT THE NORMAL TO THE PLANE

CROSS REFERENCE TO RELATED APPLICATIONS

This application is a continuation in part of application Ser. No. 11/383,814, with a filing date of May 17, 2006, which itself claims priority of provisional application Ser. No. 60/694,161 filed on Jun. 27, 2005. The entirety of these two prior applications are incorporated herein by reference.

STATEMENT REGARDING FEDERALLY SPONSORED RESEARCH

This invention was made with government support under contract number F08630-03-C-0149 issued by AFRL/MNGN, Eglin AFB. The government has certain rights in this invention.

FIELD OF THE INVENTION

This invention relates to MEMS gyroscope designs.

BACKGROUND OF THE INVENTION

The G2-Gyroscope is a Coriolis gyroscope where the drive and output sense motions are angular oscillations. Its structure is planar and composed of two members: a Gyro Member and a Drive Member. The Gyro Member is the gyro. The Drive Member supports the Gyro Member above the substrate and is used to oscillate the Gyro Member about the Drive Axis, without applying direct actuation to the Gyro Member. Under rotation rate input, the Gyro Member responds by oscillating about the Output Axis (orthogonal to the Drive Axis). The Input Axis and Drive Axis are orthogonal to each other and lie in the plane of the gyroscope. The Output Axis is aligned normal to the plane. An attribute of this design is that the Gyro Member can be made symmetric about the Output Axis and therefore reduce sensitivity to cross-axis rotation rate inputs. By using the Drive Member to indirectly drive the Gyro Member, error torques are minimized.

SUMMARY OF THE INVENTION

The inventive G2-Gyroscope design is a planar MEMS instrument intended for integration into a planar MEMS Inertial Measurement Unit (IMU) whereby gyroscopes and accelerometers, formed onto a single substrate, sense all six-degrees-of-freedom. The G2-Gyroscope is also operational on its own.

This invention relates to designs of the G2-Gyroscope.

This invention further relates to planar G2-Gyroscope designs capable of being fabricated with MEMS processing technologies.

This invention further relates to the symmetry of the Gyro Member about the Output Axis to reduce sensitivity to cross-axis rotation rates.

This invention further relates to the indirect drive of the Gyro Member through a Drive Member (DM), to which the Gyro Member is attached. The purpose is to minimize unwanted drive of the Gyro Member about the Output Axis (quadrature source).

This invention further relates to the components of the design and how they provide functionality to operate the gyroscope.

This invention also relates to the alternate design where the Gyro Member is larger and driven directly to oscillate about the Drive Axis. The larger size of the Gyro Member increases gyroscope sensitivity. In this case, the member that supports the gyro member relative to the substrate is not driven, and thus is not really a "Drive Member." This member may thus be generally termed, for both preferred embodiments, a "support member."

This invention also relates to the operation of the G2-Gyroscope. Although the gyroscope can be operated with any set of Drive Member and Gyro Member (also referred to as Inner Member) natural frequencies, the sensitivity is improved as the difference between them (offset) is reduced. Operation with an offset of zero is the most sensitive and represents a special case.

This invention also relates to the monolithic construction of the gyro to minimize structural instability. The structure is electrically connected to ground.

This invention also relates to the shape of the Drive Member (Outer Member), which can have a circular, square or rectangular outer perimeter shape. The member can also have a circular inner perimeter shape to create an annular-shaped member.

This invention also relates to the more accurate method for measuring the drive amplitude by locating the capacitive pick-off plates under the Gyro Member (Inner Member).

This invention also relates to the active measurement and suppression of quadrature.

This invention also relates to the active measurement and control of the Input Axis alignment.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS OF THE INVENTION

Design Guidelines

Figure 1A:
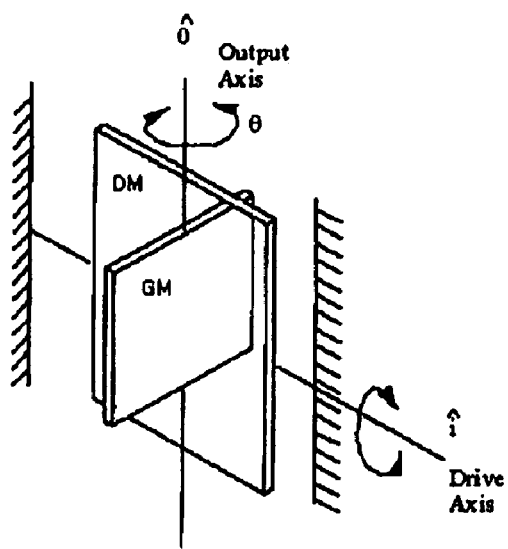
FIGS. 1A and B are stick figures representing the inventive G2-Gyroscope design structure.

The design of one preferred embodiment of the invention incorporates:

- a symmetric disk (Gyro Member or "GM" herein) in the plane of the instrument that is driven to oscillate about an axis in the plane (Drive Axis), by the use of an outer structure, the Drive Member; the gyro output motion is the oscillation of the disk about the axis normal to the plane (Output Axis); the purpose of the symmetric disk is to reduce sensitivity to cross-axis rotation rate,
- the disk is mounted to the Drive Member (DM) so that the drive of the disk about the Drive Axis is accomplished through the DM structure and actuation is not applied directly to the disk itself; the purpose is to minimize the inadvertent drive of the disk about the Output Axis,
- the Drive Member is connected with a pair of torsional flexures to bonding pads attached to the substrate,
- a mesa between the bonding pads and the substrate provides the working gap that allows motion of the GM and DM about the drive axis,
- a set of radial flexures suspends the disk from the Drive Member and allow its oscillation about the Output Axis,
- each radial flexure incorporates stress reliefs to minimize the DM stress imparted on the disk that affects its free motion,
- actuation of the Drive Member is done with two sets of capacitor plates located underneath the DM and on both sides of the Drive Axis,
- motions of the disk and Drive Member are sensed with capacitive pick-offs that operate differentially to cancel common-mode noise; at zero rotation rate, the difference in capacitance is zero and the output is zero,
- the mechanical structure consists of two moving members cut from one material (monolithic construction); the full structure is connected electrically to ground (or common electrical potential),
- the monolithic structure is mounted onto a rigid substrate onto which are also located the stators for driving (actuating) and sensing the motion of the members,
- the rigid substrate provides a stable base for the gyroscope and maintains its alignment,
- the Pyrex substrate is a material that enables anodic bonding of the epitaxial silicon structure material to the Pyrex; its electrical insulation property separates the gyroscope from other devices that may be located on the same substrate,
- the thickness of the gyroscope structure is sufficiently large that the members oscillate as thin plates with little structural distortion,
- the working gap is large enough to prevent stiction to the substrate,
- the shape of the outer perimeter of the Drive Member can be round, rectangular or square,
- quadrature is actively suppressed with a control loop by measurement and actuation using the Gyro Member rotary comb,
- the rotation of the Input Axis relative to the plane of the substrate can be measured with the Drive Member sense plates and controlled by applying corrective voltages to the Drive Member actuator plates.

Note that in the G2-Gyro the Drive Member is also known as the Outer Member, and the Gyro Member is also known as the Inner Member.

Modeling

G2-Gyroscope Structure

Figure 1B:
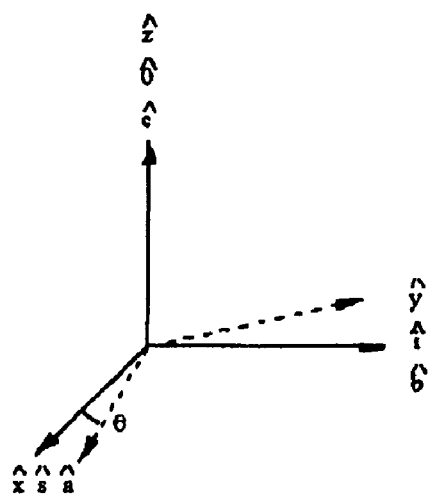

The G2-Gyro structure is based on two nested members that oscillate in angle about orthogonal axes defined by two sets of flexures as shown in FIGS. 1A and 1B. The inner member is called the Gyro Member (GM) and the outer member is called the Drive Member (DM). The Gyro Member is mounted with flexures to the Drive Member and rotates by angle $\vartheta$ relative to the Drive Member. The DM is mounted to the case (substrate) with flexures and rotates by angle $\phi$ relative to the case (substrate). Since the gyroscope is an oscillatory device, the angles $\vartheta$, $\phi$ are small. The two sets of flexures define axes of rotation that are orthogonal. There are three co-ordinate axes that apply; the first, (s,i,o) is fixed to the Gyro Member; the second, (x,y,z) is fixed to the Drive Member and the third, (a,b,c) is fixed to the case and rotates in inertial space. The case angles of rotation are not limited. The Gyro Member equation of motion describes the motion of the GM under rotation in inertial space and describes the output of the gyro.

Equation of Motion

Analysis is used to derive the equation of motion for the Gyro Member when the Drive Member is oscillated at some frequency and amplitude as the Case undergoes rotation in inertial space. The resultant equation of motion is given by $$I_{GM}\ddot{\vartheta} + D_{GM}\dot{\vartheta} + \left[K_{GM} + \left\{(\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right\}\right.$$
$$\left.\Delta I\right]\vartheta - (\Omega_a\Omega_b + \Omega_a\Omega_c\tilde{\phi}\sin\omega t + \Omega_a\tilde{\phi}\omega\cos\omega t)\vartheta^2 =$$
$$I_{GM}\Omega_a\tilde{\phi}\omega\cos\omega t - \Delta I(\Omega_a\Omega_b + \Omega_b\Omega_c\tilde{\phi}\sin\omega t + \Omega_a\tilde{\phi}\omega\cos\omega t) \quad (1)$$

where $I_{GM}$: GM moment of inertia about the o-axis (Output Axis)
$D_{GM}$: GM damping
$K_{GM}$: GM flexure stiffness (spring constant)
$\vartheta$: rotation angle of the GM relative to the DM
$\phi$: DM rotation angle relative to the case
$\Omega_a, \Omega_b, \Omega_c$: rotation rates of the case in inertial space about three axes
$\Delta I = I_i - I_s$: difference of GM inertias about the i-axis and s-axis $\phi = \tilde{\phi}\sin(\omega t)$: DM oscillatory angular motion
$\dot{\phi} = \omega\tilde{\phi}\cos\omega t$: rate of DM angular motion To the left of the equals sign are included the torque terms dependent on inertia, damping and stiffness as well as a nonlinear (fourth) term dependent on GM angle squared. The stiffness (third) term is given by $$\left[ K_{GM} + \left\{(\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right\}\Delta I \right] \quad (2)$$

The stiffness term includes a constant flexure stiffness, $K_{GM}$, and a component dependent on vehicle rotation rates, $\Omega_a, \Omega_b, \Omega_c$, DM drive frequency, $\omega$, and a factor referred to as the tuning inertia, $\Delta I$.

On the right of the equals sign are given terms that drive the GM. They include a gyroscope torque due to rotation rate about the Input Axis and others due to case rotation about cross-axes that are coupled by the tuning inertia. They are respectively: $I_{GM}\Omega_a\tilde{\phi}\omega \cos \omega t$ and $\Delta I(\Omega_a\Omega_b + \Omega_b\Omega_c\tilde{\phi}\sin\omega t + \Omega_a\tilde{\phi}\omega\cos \omega t)$.

G2-Gyro Mechanization/Mechanical Response

From the equation of motion, the gyroscope operation is simplified by making the GM symmetric about the o-axis (Output Axis) so that $\Delta I=0$. The resultant equation of motion becomes $$I_{GM}\ddot{\vartheta} + D_{GM}\dot{\vartheta} + K_{GM}\vartheta = I_{GM}\Omega_a\tilde{\phi}\omega \cos \omega t \quad (3)$$

The interpretation is that of a simple harmonic GM oscillator driven externally by a gyroscopic torque that results from the oscillatory motion of the DM and input rotation rate. Rewriting the GM EOM in the "Standard Form", we get $$\ddot{\vartheta} + 2\xi\omega_{GM}\dot{\vartheta} + \omega_{GM}^2\vartheta = \tilde{\phi}(\omega)\omega\Omega_a\cos\omega t \quad (4)$$

where $$2\xi_{GM}\omega_{GM} = D_{GM}/I_{GM} \quad \xi_{GM} = \frac{1}{2}\frac{D_{GM}}{I_{GM}\omega_{GM}} \quad (5)$$

$\xi_{GM}$ is the GM damping factor, and $$\omega_{GM}^2 = K_{GM}/I_{GM} \quad \omega_{GM} = \sqrt{\frac{K_{GM}}{I_{GM}}} \quad (6)$$

where $\omega_{GM}$ is the GM natural frequency.

The solution describes the oscillatory motion of the GM in response to gyroscope input rotation rate, and is given by $$\vartheta(t) = \tilde{\vartheta}\sin(\omega t - \epsilon_{GM}) \quad (7)$$

where $\tilde{\vartheta}$ is the GM oscillatory amplitude and $\epsilon_{GM}$ is the GM oscillation phase relative to the gyroscopic drive.

$$\tilde{\vartheta}(\omega) = \frac{\frac{I_{GM}}{K_{GM}}\Omega_a\omega\tilde{\phi}(\omega)}{\left[\left(2\xi_{GM}\frac{\omega}{\omega_{GM}}\right)^2 + \left(1 - \frac{\omega^2}{\omega_{GM}^2}\right)^2\right]^{1/2}} \quad (8)$$

$$\epsilon_{GM}(\omega) = \tan^{-1}\left(\frac{2\xi_{GM}\frac{\omega}{\omega_{GM}}}{1 - \frac{\omega^2}{\omega_{GM}^2}}\right) \quad (9)$$

These solutions can be plotted to obtain the Transfer Functions or Bode of the GM. Note that the response is also dependent on the DM amplitude, which also varies with angular frequency (the GM is coupled to the DM).

Practical Gyroscope Case—Offset Operation

For the practical gyroscope, the DM is driven at resonance to minimize the drive voltage and to maximize the DM oscillation amplitude. The GM response then depends on the GM and DM natural frequencies (note that the DM comprises the gyro disk for purposes of calculating the DM inertia about the Drive Axis and the DM natural frequency). The maximum DM amplitude and phase at resonance are given by $$\tilde{\phi}(\omega_{DM}) = \frac{\tilde{\Gamma}_{DM}}{D_{DM}\omega_{DM}} \quad (10)$$

$$\epsilon(\omega_{DM}) = \frac{\pi}{2}$$

where $$\Gamma_{DM} = \frac{V^2}{2}\frac{\delta C}{\delta\phi} \quad (11)$$

is the torque applied by the capacitive actuator. The GM responses for amplitude and phase for GM and DM natural frequencies are $$\tilde{\vartheta}_{Out} = \tilde{\vartheta}(\omega_{DM}) \quad (12)$$

$$= \frac{\frac{I_{DM}}{K_{DM}}\Omega\omega_{DM}\phi(\omega_{DM})}{\left[\left(2\xi_{GM}\frac{\omega_{DM}}{\omega_{GM}}\right)^2 + \left(1 - \frac{\omega_{DM}^2}{\omega_{GM}^2}\right)^2\right]^{1/2}}$$

$$\epsilon_{GM}(\omega_{DM}) = \frac{\pi}{2} + \tan^{-1}\left(\frac{2\xi_{GM}\frac{\omega_{DM}}{\omega_{GM}}}{1 - \frac{\omega_{DM}^2}{\omega_{GM}^2}}\right) \quad (13)$$

Matched Frequency Case: Zero Offset

The maximum sensitivity is obtained for the case in which the DM and GM resonances are matched, $\omega_{DM}=\omega_{GM}$. The output per rotation rate input (Scale Factor) then is given by $$\tilde{\vartheta}_{matched} = \frac{I_{GM}}{D_{GM}}\tilde{\phi}\Omega_a \quad (14)$$

The output amplitude is dependent directly on the GM inertia, inversely with damping and directly with DM oscillation amplitude. A vacuum is necessary to develop the proper damping. In this case, it can readily be seen that the gyro sensitivity scales with size and inversely with damping.

General Offset Description

Figure 2:
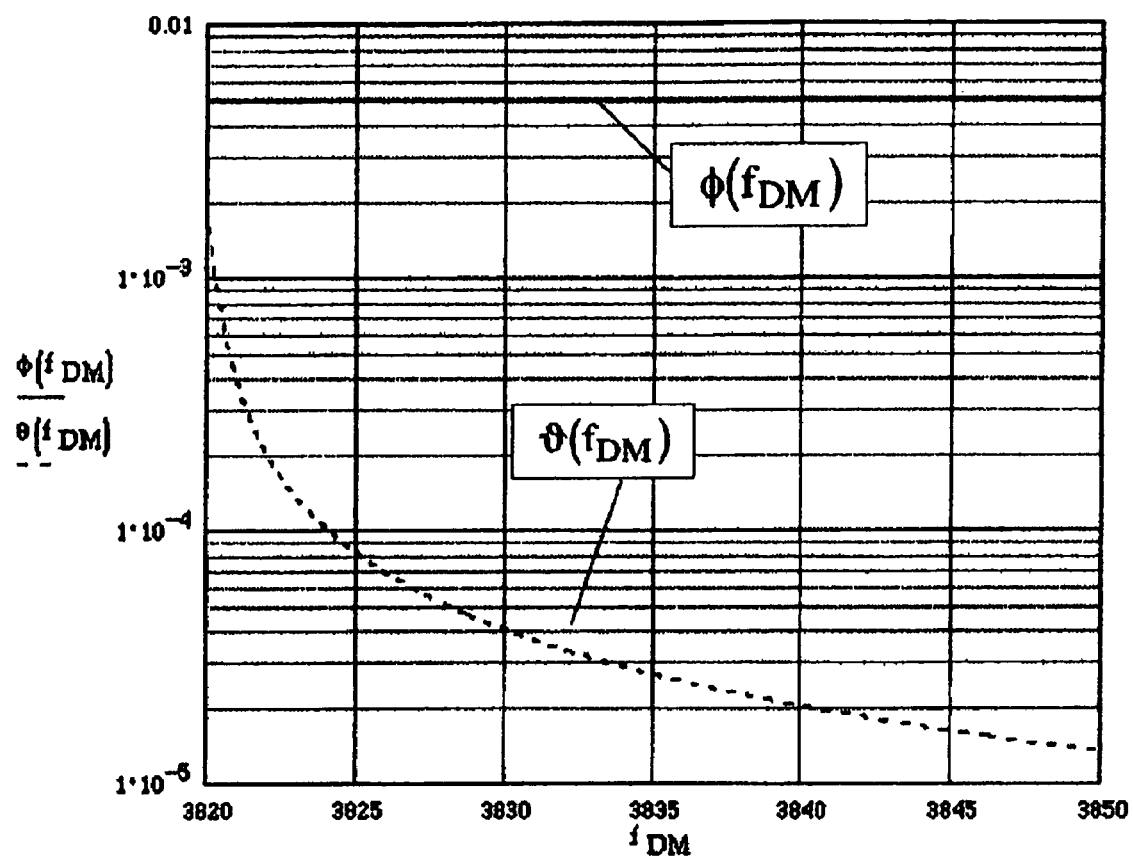
FIG. 2 is a graph of the Gyro signal dependence with offset frequency.

Gyro sensitivity is dependent on the separation (offset) between the GM and DM natural frequencies. In FIG. 2 is plotted the modeled dependence for a typical gyro case. The top curve is of the DM amplitude $\phi(f_{DM})$ and it is held constant. The lower curve is of the GM amplitude response for an input rotation rate of 1 rad/sec. Its amplitude $g(f_{DM})$ depends on the DM frequency and it increases as the offset is reduced.

G2-Gyro Operation Requirements
the DM is driven at resonance to the maximum amplitude possible as limited by the working gap between the device and the substrate,
a phase-lock loop is used to maintain the operation of the DM at resonance,
the DM amplitude is held constant with an amplitude control loop,
the DM-GM frequency offset is held constant,
excitation frequencies for operating the DM and GM capacitive pick-offs need to be sufficiently different to minimize pick-up between them,
GM and DM oscillation axes are orthogonal to prevent drive of the GM by the DM oscillation,
DM actuation is done without actuating the GM directly,
the Input Axis needs to be parallel to the plane of the substrate, and
a reference waveform developed from the motion of the DM is used to demodulate the oscillatory output of the gyro to a DC value; the proper phase is required.

G2-Gyro Operation

The DM is driven at some frequency and amplitude about the Drive Axis. When the gyro is rotated about the Input Axis (orthogonal to both the Drive Axis and Output Axis), the GM responds with an oscillation amplitude that is proportional to the Input Rotation Rate. Demodulation of the oscillatory output with a reference waveform at the same frequency and with the appropriate phase generates a gyro output DC voltage proportional to the Input Rotation Rate.

G2-Gyro Quadrature

A signal that is in "quadrature" with the gyro signal is an error signal generated by the improper operation of the gyroscope and the gyroscope design. Fortunately it is always out of phase by 90 degrees with the gyro signal and can be separated and filtered by proper demodulation. The phase of the demodulation reference waveform is to be controlled to prevent leakage of the quadrature signal into the gyro signal channel.

G2-Gyroscope Embodiment

Mechanical Design

Figure 3:
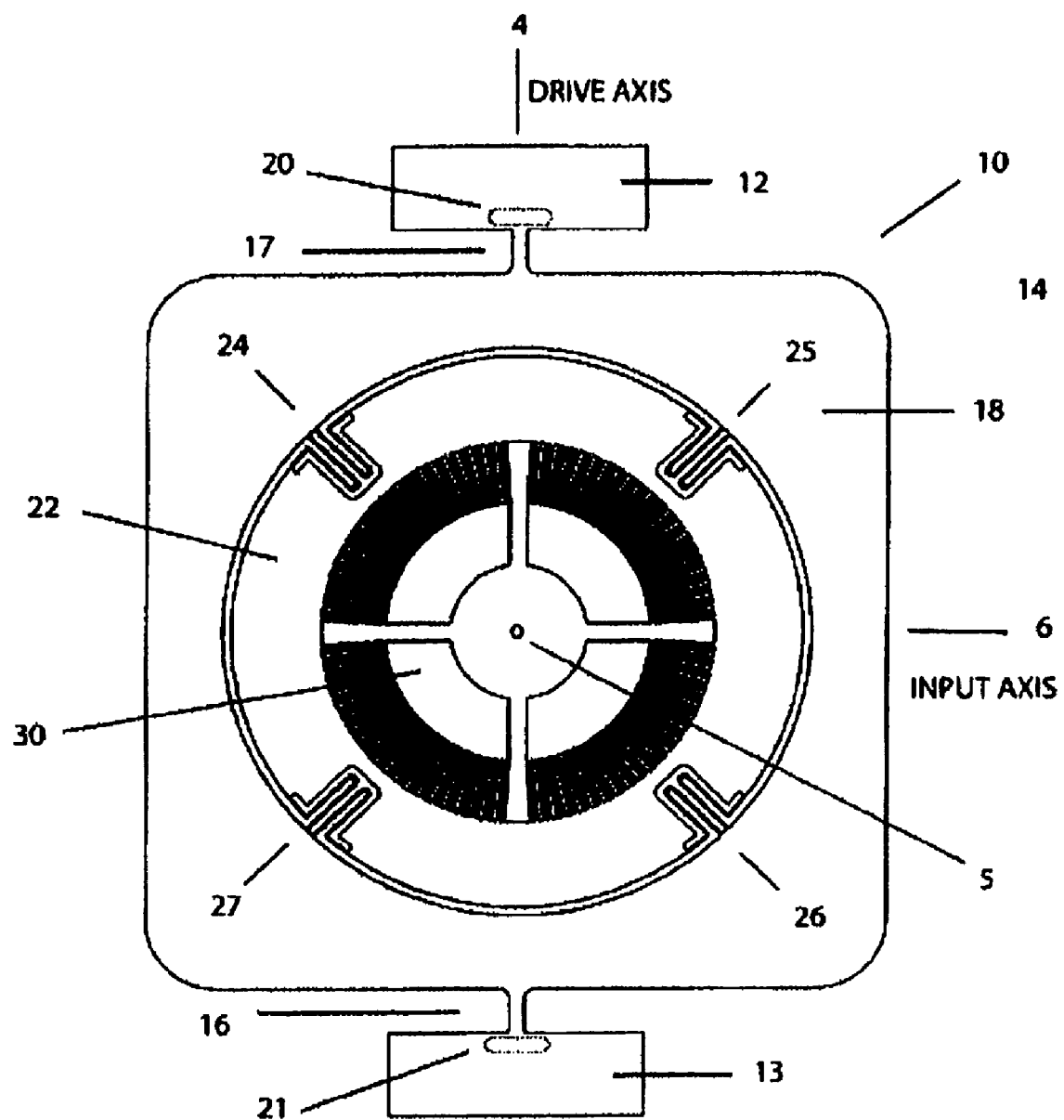
FIG. 3 is a top view of one embodiment of the inventive G2-Gyroscope mechanical design.
Figure 4:
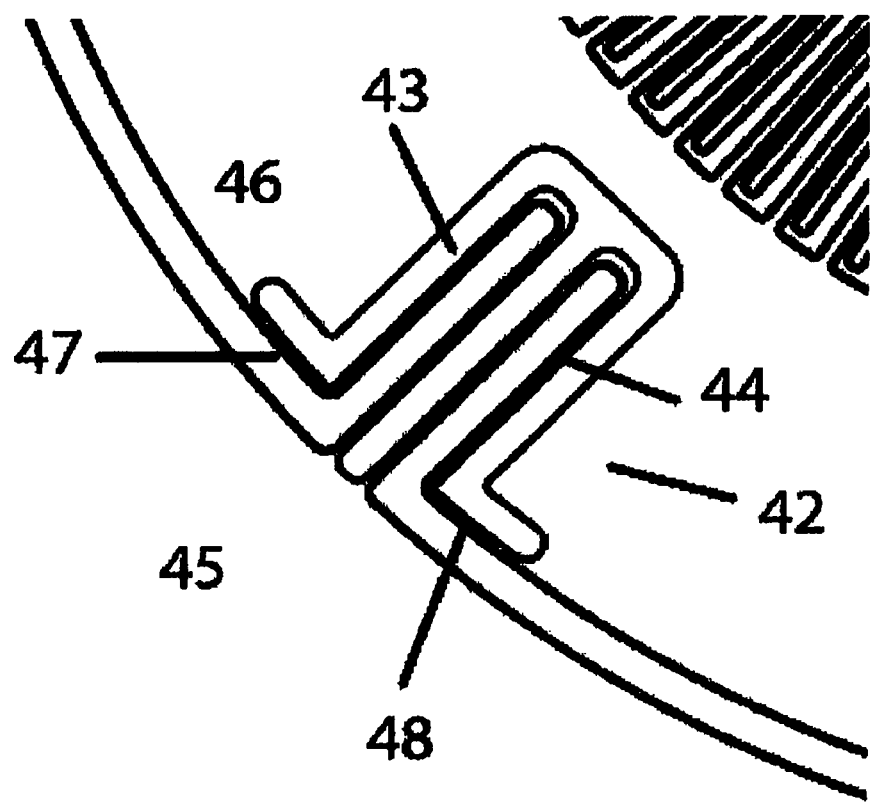
FIG. 4 is a close up view of the W-flexure of the G2-Gyroscope of FIG. 3.

The mechanical design of one preferred embodiment of the inventive G2-Gyroscope 10 is shown in FIG. 3. The rectangular shapes on each end are bonding pads 12, 13 used to bond the device to the Pyrex substrate 14. Two torsional flexures 16, 17 connect the Drive Member 18 to the bonding pads. The flexures are stress-relieved by the oval cutouts 20, 21 in the bonding pads. The square DM shape allows the placement of sufficiently large capacitive plates underneath for actuation. Sense plates are used to measure the motion of the DM. The Gyro Member 22 is an annular disk connected to the DM with four W-shaped flexures 24, 25, 26, 27. The W-flexure design 42 shown in FIG. 4 is made up of two U-shaped flexures 43, 44. One end of each is connected to the DM 45 and the other to the GM disk 46 through L-shaped segments 47, 48 essentially tangent to the disk curvature. The L-shaped segment is added to enable the U-structure to bend with GM rotation and to absorb stress between the DM and GM. The radial alignment of the flexures along diagonals across the DM makes a symmetric arrangement with each flexure intended to experience the same stress. Other types, quantities and locations of radial flexures can be used.

The gyro is driven by actuation of the DM about the Drive Axis 4. The Output Axis 5 is normal to the plane of the DM. The Input Axis 6 is orthogonal to the other two.

The working gap between the gyro structure and the Pyrex substrate is 10 microns but the gap used depends on several factors: geometry, actuation capacity, sensitivity and fabrication constraints. The gap is fabricated by etching a well in the silicon and a well in the Pyrex.

The use of Pyrex is dependent on the need to anodically bond epitaxial silicon to a substrate as described below in the DWP process. Other processes are possible. It is preferred to use a substrate that has similar thermal characteristics to the device material, which in this case is silicon. An option is to also use silicon as the substrate for a close thermal match and to enable anodic bonding with a deposited Pyrex-equivalent film added to the substrate silicon. This would also preserve the electrical isolation between devices on the same substrate.

It is preferred for the device to be monolithic for mechanical stability and to connect it to electrical ground.

On the inside diameter of the GM is constructed a radial comb for sensing the rotation of the GM. The comb teeth are aligned radially with the GM center of rotation. Four sets of mating combs are constructed on four separate quadrants fixed separately to the substrate that serve as stators for the moving comb rotor on the GM. By connecting their bonding pads to traces, excitation voltages can be applied to them and current responses obtained as the Gyro Member rotates. The silicon structure is connected to electrical ground.

Rotary Comb Capacitive Sensor

Figure 5:
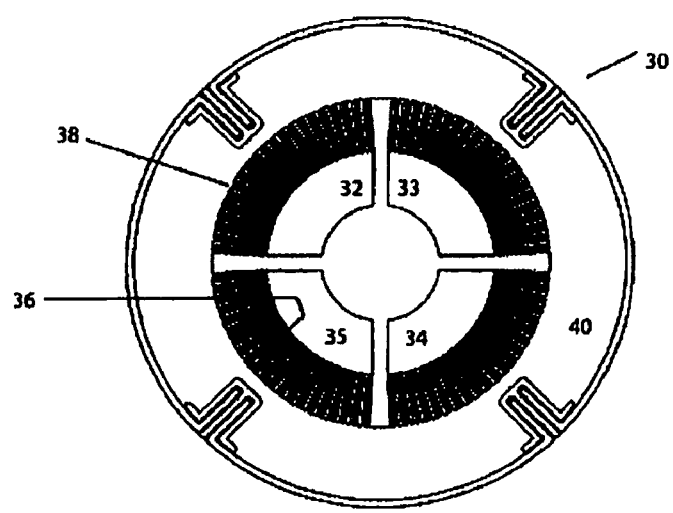
FIG. 5 is a close up view of the rotary comb design of the gyro of FIG. 3.

The rotary comb design 30 is illustrated in FIG. 5. It is separated into four quadrants 32, 33, 34, 35. For each quadrant, the comb is divided into a stator with stator comb fingers 36 attached to the substrate 14 and a rotor with rotor comb fingers 38 that are part of the moving GM disk structure 40. The stator fingers and rotor fingers are aligned radially with the center of rotation of the disk. For each rotor finger there is a stator finger with the two separated by a small gap. They make up a comb finger pair. Pairs of comb fingers are separated by a large gap. A number of comb finger pairs makes up each quadrant. The sensitivity of the comb sensor scales with the number of comb finger pairs. By reducing the small gap between the comb finger pairs, the sensitivity is increased.

Figure 6:
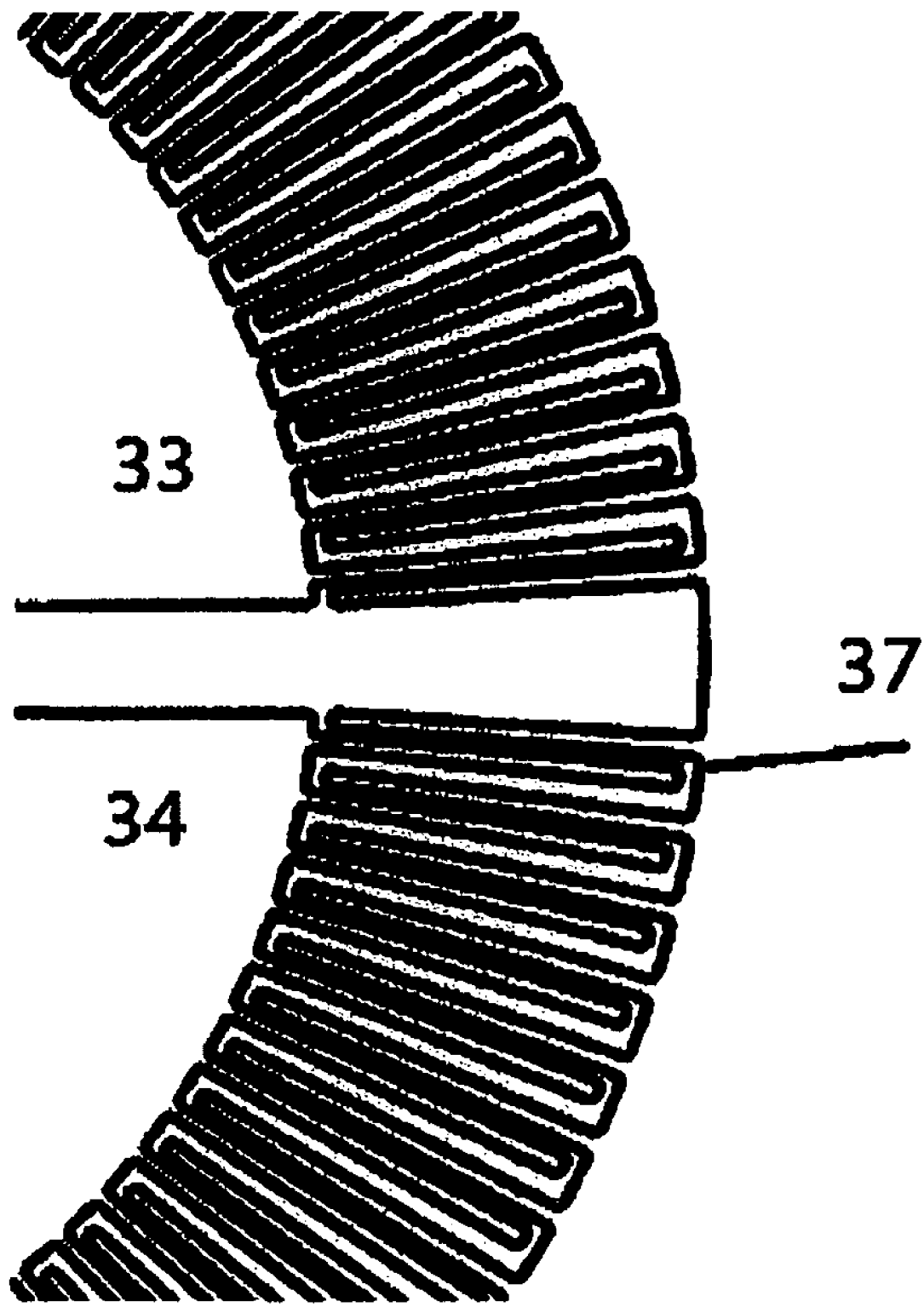
FIG. 6 shows the differential alignment between rotary comb quadrants of the rotary comb shown in FIG. 5.

Neighboring quadrants 33, 34 (an example pair) are designed symmetrically about the axis that separates them as shown in FIG. 6. For rotation of the rotor in either direction, the small gap 37 of comb finger pairs in one quadrant decreases while the small gap of comb finger pairs in the other quadrant increases. The large gap 39 is shown in the same figure. The purpose of the rotary design, based on neighboring quadrants, is that when the signals from the comb finger pairs located on neighboring quadrants are differenced, the signals add and the common-mode noise subtracts; this is differential operation. At zero rotation of the GM, the output is also zero. When the output from the third and fourth quadrants are added to the first and second, the signal is doubled again. This is the preferred operation of the rotary comb of the gyro for maximum sensitivity.

Alternate uses of the rotary comb are possible if one set of neighboring quadrants is connected for rotary sensing and the other set for actuation. One use is to test the operation of the Gyro Member separately. The second use is to cancel quadrature error by adding a counter motion of the Gyro Member.

Metallization Design of the G2-Gyroscope

Figure 7:
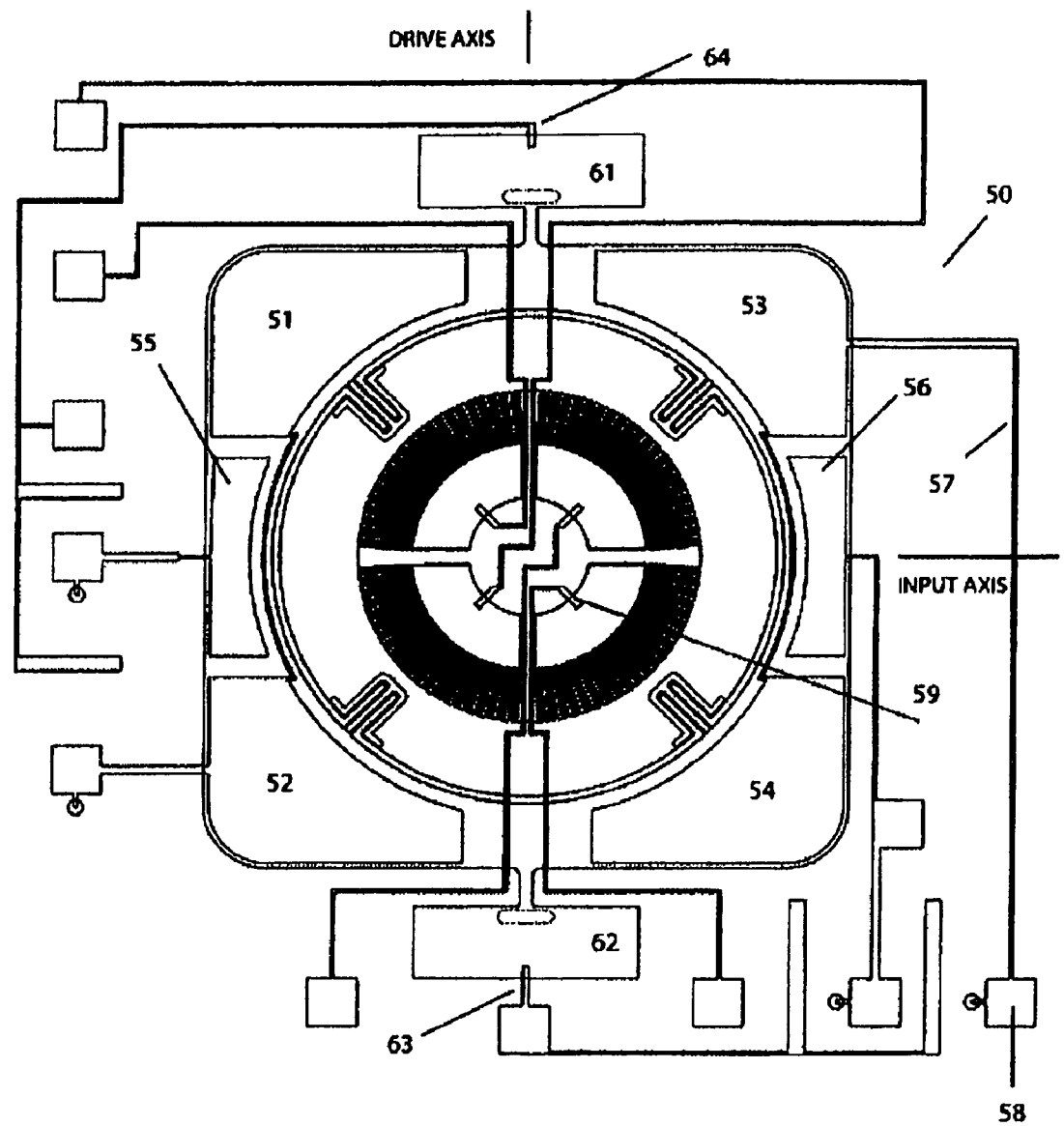
FIG. 7 is a schematic representation of the G2-Gyro metallization design for the embodiment of FIGS. 3-6.

The metallization design 50 is shown in FIG. 7. It consists of capacitive plates, conductor traces and electrical connector pads. A first set of actuator capacitive plates 51 and 52 are located under part of the DM on one side of the Drive Axis.

They are connected by a trace. A second set of actuator capacitive plates 53, 54 are located on the other side. They are connected by a trace. Drive voltages are applied to the actuator plates to predominantly pull down on one side of the DM during the first half of the drive cycle and to predominantly pull down on the other side of the DM during the second half of the drive cycle. The result is an oscillatory motion of the DM about the Drive Axis. The sensing of the DM motion is accomplished with two capacitive plates 55, 56. The outputs are connected differentially, since for any motion, the gap for one increases and the gap for the other decreases.

Trace 57 connects capacitive plates 53, 54 to the electrical connector pad 58, for example.

Stators of the rotary comb are connected to electrical connector pads with traces 59 that are crimped between the stator bonding pads 28 and the Pyrex substrate during anodic bonding. The monolithic gyro structure containing the GM and DM is connected to electrical connector pads by traces 63, 64 crimped between the bonding pads 61, 62 and the Pyrex substrate. The preferred electrical connection of the gyro structure is to electrical ground.

Traces are also capacitive sensing plates when they are located beneath the moving structure and this needs to be taken into consideration. A rule is to make the lengths under the moving parts equal and symmetric. Pick-up between plates and traces is also a consideration. The usual design practices apply. Electrical pick-up can be a source of quadrature in the gyro output.

Flexures

The purposes of flexures are to:

set orientational alignment between members, govern rotation of the members about prescribed axes, and provide support for the members of the structure.

The orientational alignment between members is an especially important consideration for the gyroscope because misalignment introduces mechanical coupling between the DM oscillation and the Gyro Member and will generate quadrature error.

The ideal flexure allows only motion about one axis in the dynamic environment.

The support capability is especially important when considering shock capability. It depends on the masses of the members and the spring stiffness of the flexures. Modeling is used to identify the strain on the flexures. A maximum strain level less than one tenth the fracture limit is a good condition to set.

DM Flexure Relief Structure

The stress relief absorbs the tension on the flexure that is due to the differential thermal contraction as the Pyrex and silicon cool from the elevated anodic bonding temperature. The stress can cause a potato-chip deformation of the DM that affects the GM suspended from it.

GM Flexure Relief Structure

The W-flexure enables rotation of the GM about the axis normal to the plane. Four are used in this design. Each W-flexure is composed of two bending U-flexures with a stress relief in each. For cases where the DM applies a tension or compression to the W-flexure, the stress relief can bend and absorb the stress. In this way, the flexure does not kink and inhibit rotation of the GM.

G2-Out Gyroscope—Alternative Embodiment

The G2-Out Gyroscope 70 is a variation on the G2-Gyroscope where the Gyro Member 80 is the structural outer member, and the Gyro Member is driven directly about the Drive Axis 84. The Output Axis is still normal to the plane. The alignments of the Drive Axis and Input Axis 85 are orthogonal as specified with the G2 Gyroscope description.

Mechanical Design of the G2-Out Gyroscope

Figure 8:
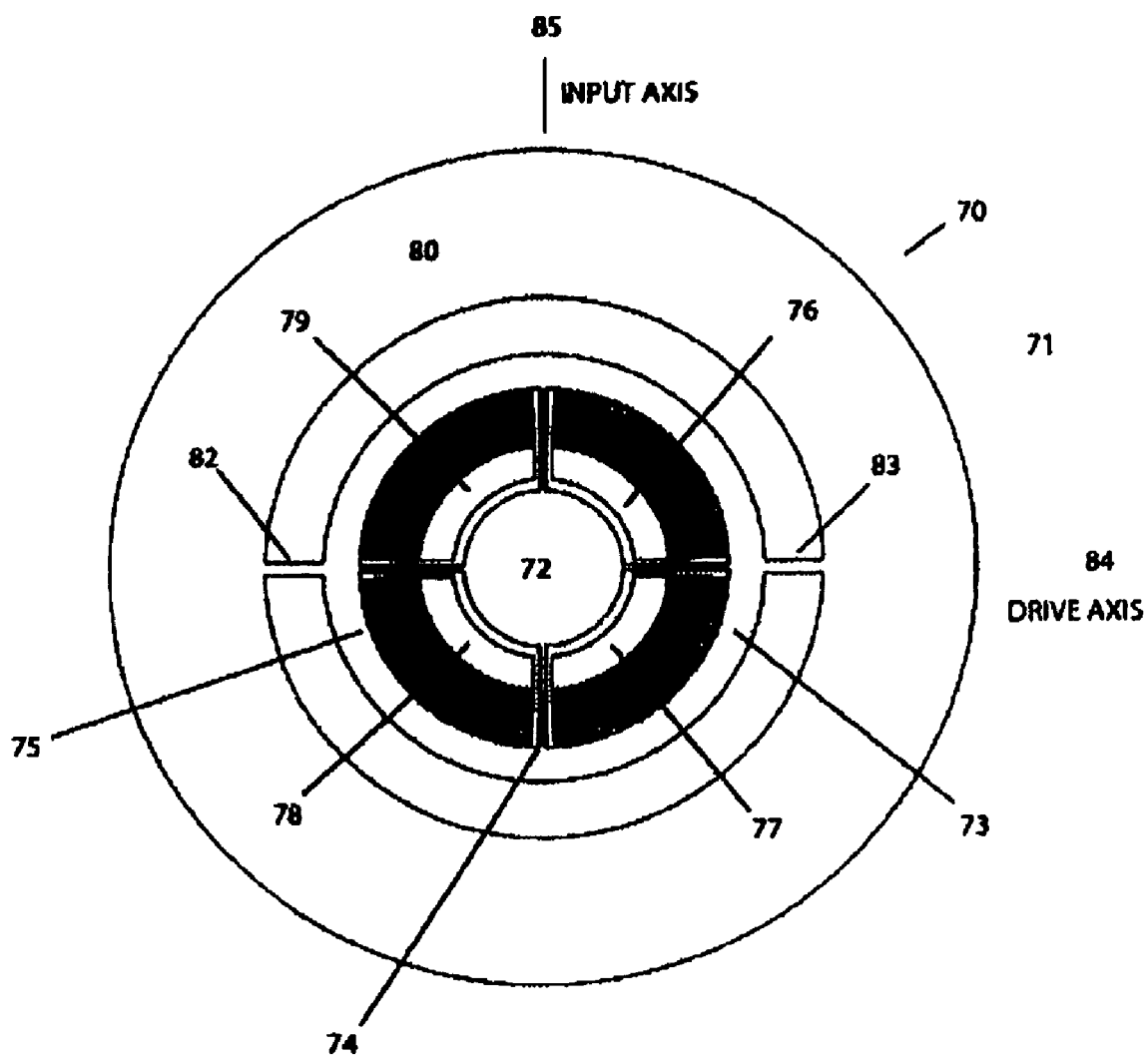
FIG. 8 is a top view of an alternative preferred embodiment of the invention, showing a G2-Out Gyroscope mechanical design.

The mechanical design of the G2-Out gyro embodiment of the invention is described with FIG. 8. The gyro is mounted to the Pyrex substrate 71 via the mounting post 72 in the center. Ring structure 73 is attached to central post 72 with four radial flexures 74. The radial flexures allow oscillation of the gyro about the Output Axis (normal to the plane). From the ring is attached the rotor 75 of the capacitive rotary comb sensor. The fingers of the rotor extend radially towards the center of rotation. Four radial comb stators 76, 77, 78, 79 are mounted to the Pyrex substrate. The fingers of each stator extend outwards and are located in between the rotor fingers. The radial comb sensor design is identical to the component used for the G2-Gyro.

The ring structure 73 is connected to the disk 80 with two torsional flexures 82, 83. These flexures allow oscillation of the GM about the Drive Axis.

Metallization Design of the G2-Out Gyroscope

The metallization design is similar to that of the G2-Gyro. Plates located beneath the GM disk are used to actuate and sense the motion of the disk about the Drive Axis. Unlike the G2-Gyro, however, the GM is driven directly by the actuator plates. This can lead to direct drive of the disk about the Output Axis (quadrature error). The benefit is that the disk of the G2-Out Gyro is much larger, allowing for greater sensitivity since the inertia is greater.

Figure 9:
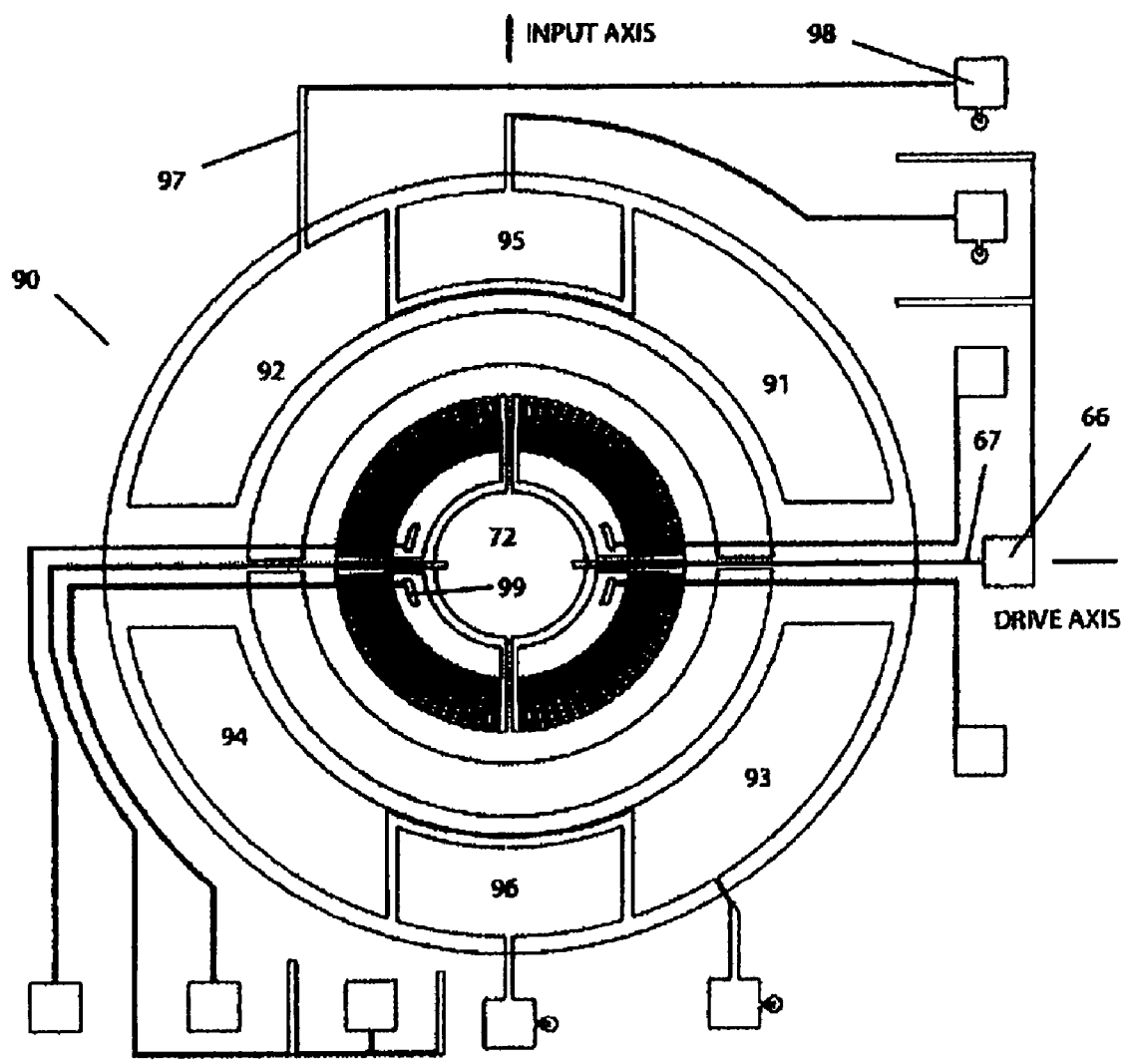
FIG. 9 is a schematic representation of the metallization design for the G2-Out Gyro embodiment of FIG. 8.

The metallization design 90 is shown in FIG. 9. It consists of capacitive plates, conductor traces and electrical connector pads. One set of actuator capacitive plates 91 and 92 are located under part of the GM disk on one side of the Drive Axis. They are connected by a trace. The second set of actuator capacitive plates 93, 94 are located on the other side. They are connected by a trace. Drive voltages are applied to the actuator plates to predominantly pull down on one side of the disk during the first half of the drive cycle and to predominantly pull down on the other side of the disk during the second half of the drive cycle. The result is an oscillatory motion of the GM disk about the Drive Axis. The sensing of the GM disk motion about the Drive Axis is accomplished with two sense capacitive plates 95, 96. The outputs are connected differentially since for any motion, the gap for one increases and the gap for the other decreases.

Trace 97 connects capacitive plates 91, 92 to electrical connector pad 98, for example.

Stators of the rotary comb are connected to electrical connector pads with traces 99 that are crimped between the stator bonding pad and the Pyrex substrate during anodic bonding. The monolithic gyro structure is connected to electrical connector pad 66 by trace 67 crimped between the bonding pad 72 and the Pyrex substrate. The preferred electrical connection of the monolithic gyro structure is to ground.

Traces are in themselves capacitive sensing plates when they are located beneath the moving structure and this needs to be taken into consideration. A rule is to make the lengths under the moving parts equal and symmetric. Pick-up between plates is also a consideration. The usual design practices apply. Electrical pick-up can be a source of quadrature in the gyro output.

G2-Out Gyro Operation

For the operation of the G2-Out Gyro, the GM is oscillated about the Drive Axis. With Input Rate applied about the Input Axis, the GM disk also oscillates about the Output Axis. The rotary comb sensor measures the output motion of the GM.

DESCRIPTION OF PREFERRED ELECTRONICS

Figure 10:
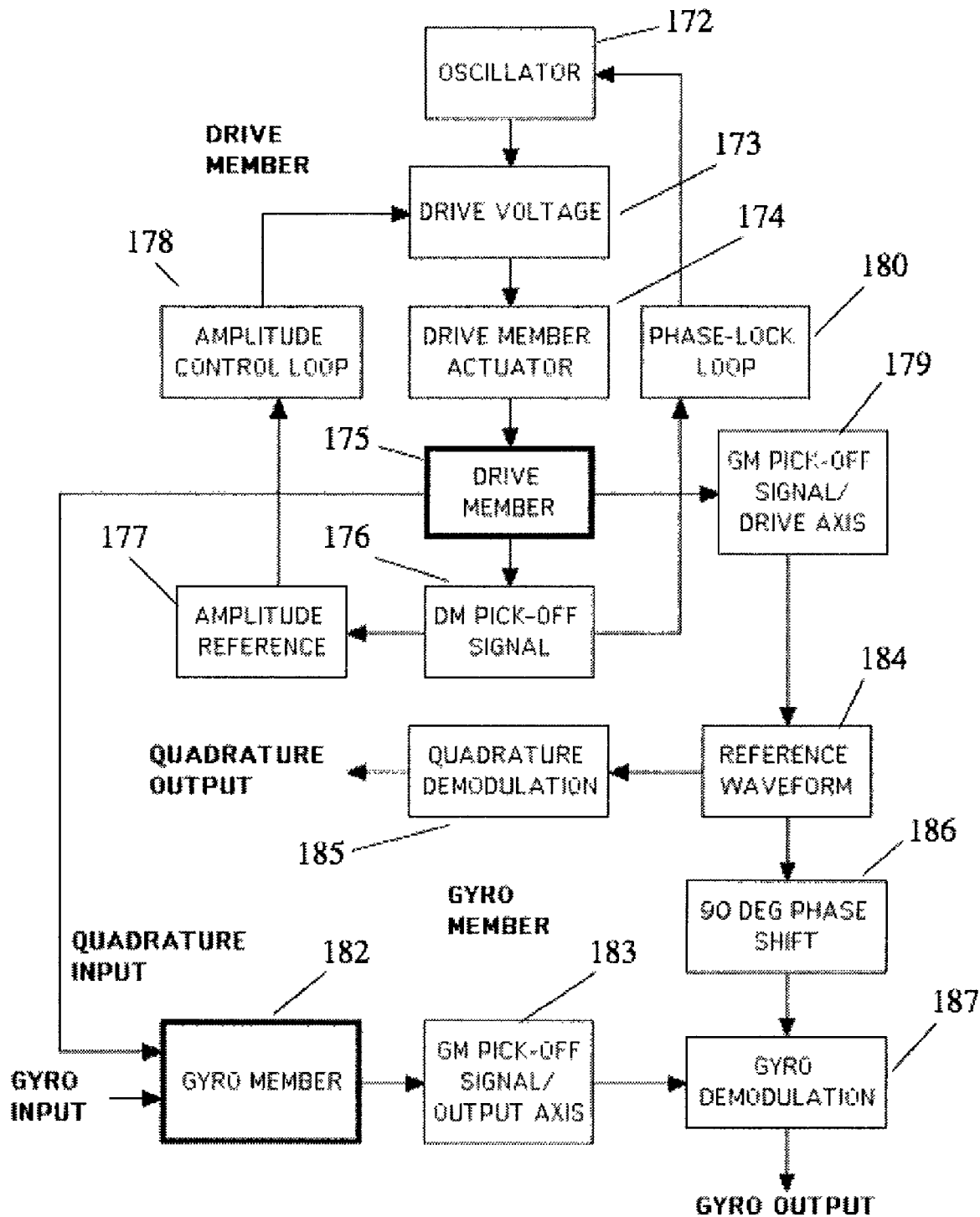
FIG. 10 is a schematic diagram of the preferred electronics for operation of the inventive G2-Gyroscope.

The preferred electronics for the various embodiments of the invention can be described schematically with FIG. 10. A voltage-controlled oscillator 172 generates the Drive Member AC drive frequency. A drive voltage 173 containing a DC value plus an AC amplitude where the AC amplitude is less than the DC value. The drive voltage is applied to the capacitive Drive Member actuator 174 to drive the DM 175 into oscillation. A set of capacitor plates under the DM is used to sense the motion of the DM about the Output Axis. A Phase-lock loop 180 acts on the phase of the DM pick-off signal 176 to keep the DM on-resonance by varying the oscillator frequency. An amplitude control loop 178 compares the DM pickoff signal to an amplitude reference voltage 177 and varies the AC amplitude drive voltage to maintain the DM amplitude constant. The Gyro Member signal about the Drive Axis is obtained with pick-off 179. The signal is used to construct reference waveforms for demodulating the quadrature and rotation rate signal components of the Gyro Member output signal. If the G2-Gyro embodiment does not use capacitive sense plates under the Gyro Member, then the DM pick-off signal is used and a phase adjustment is made to obtain the proper reference waveform.

The gyro Input is rotation rate about the gyro Input Axis. The gyro response to input is the oscillation of the Gyro Member 182 about the Output Axis at the drive frequency. The signal is obtained with the GM pick-off 183, which uses the capacitive rotary comb. The pick-off signal, however, also contains the quadrature component. By using the reference waveform 184, the quadrature signal is demodulated 185 to a DC output value. By phase shifting the reference waveform 184 by 90 degrees of phase 186, the gyro response of the Gyro Member signal is demodulated 187 to a DC output value. It will be important to maintain the phase of the reference waveform stable to prevent leakage of the quadrature signal into the gyro output. If the G2-Gyro embodiment does not use GM sense plates then the DM pick-off signal is used to construct the reference waveform.

Input rotation rate generates an oscillation of the Gyro Member about the Output Axis with an amplitude that is proportional to the rotation rate. By demodulating the AC output signal with a reference waveform, the gyro output is converted to a DC voltage that is proportional to rotation rate. The gyroscope is operated open-loop.

Dissolved Wafer Processing

Dissolved Wafer Processing (DWP) is a MEMS fabrication process for making relatively large parts with good flatness and square profiles. The process requires two wafers: the first Pyrex and the second silicon, with a Boron-doped epitaxial layer. The combination of materials enables the two wafers to be anodically bonded. The thickness of the epitaxy determines the final device thickness, while Boron doping of the epitaxial layer inhibits EDP etching.

Typical dimensions include: device size of about 3 mm in the plane, device thickness of 40 microns, smallest flexure thickness of 5 microns and gaps between comb fingers of 5 microns. Other dimensions, especially thickness, are possible.

Four process masks are needed: two for processing the silicon and two for the Pyrex. Instrument functions are distributed between the two layers: the mechanical structure and stator comb components are fabricated in the doped silicon layer and the electrical connections and flat capacitive plate components are deposited onto the Pyrex layer.

Process Steps

Figure 11:
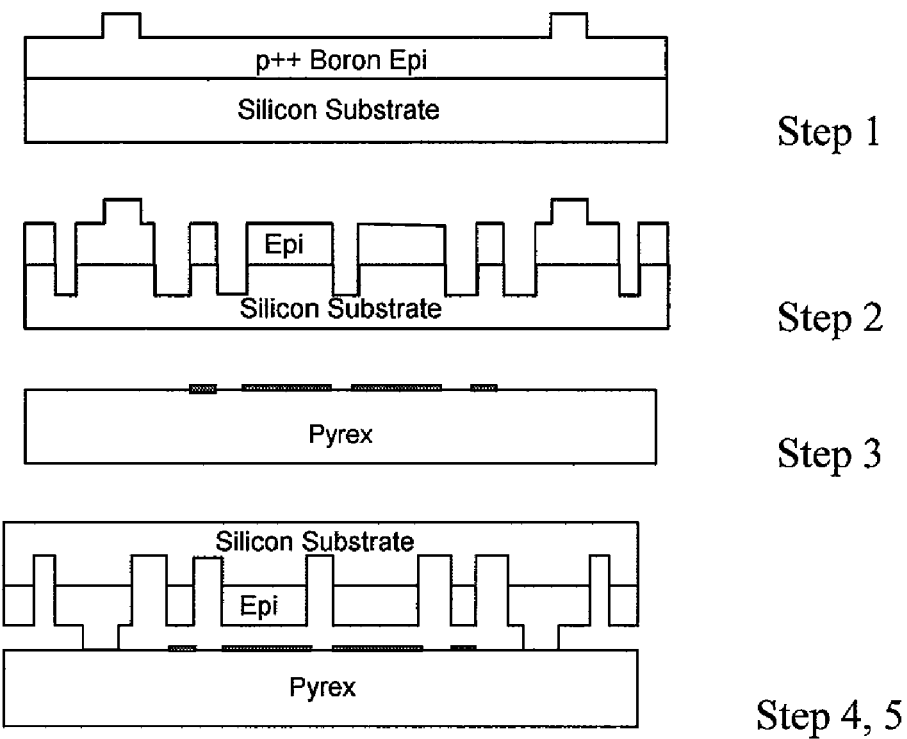
FIG. 11 schematically depicts the dissolved wafer process steps for the preferred manner of fabricating the inventive gyro.
Figure 12:
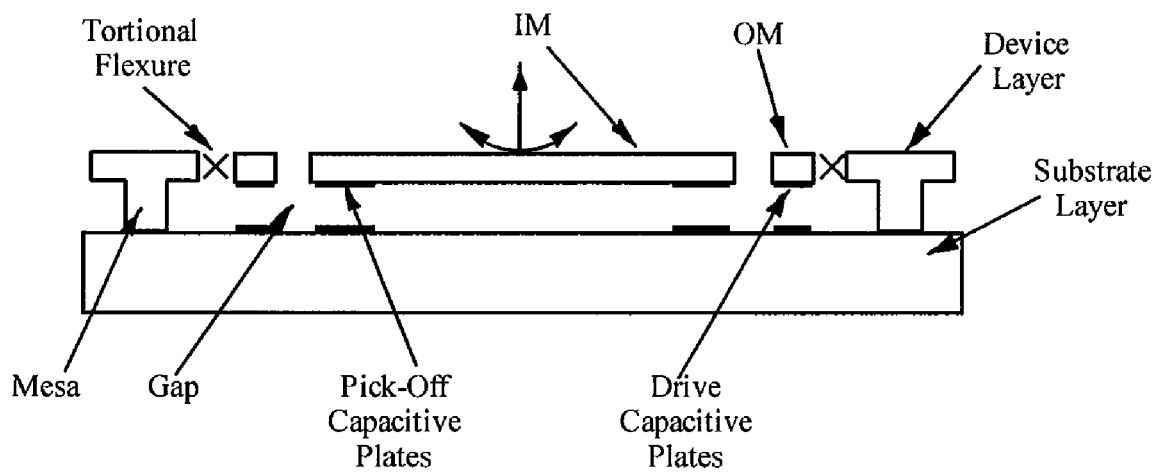
FIG. 12 is a schematic side-view of the completed device from FIG. 10 after the silicon is etched by EDP.

The process steps are described with FIG. 11. The starting silicon wafer includes a grown epitaxial layer with heavy boron diffusion of 43-micron thickness. In step 1, the epitaxial layer is etched to form mesas that support the silicon structures on the Pyrex as patterned by Mask 1. The mesa thickness also sets part of the gap between the device and the substrate that allows motion of parts. In step 2, deep reactive ion etching is used to etch through the epitaxial layer to form the device geometry that includes the structure, mass and combs as patterned with Mask 2. In step 3, wells are formed in the Pyrex to form the rest of the required gap using Mask 3. With Mask 4 (step 4), metal deposited on the Pyrex is patterned to form capacitive plates for driving and sensing out of plane motions. In addition, it patterns traces (conductors) that connect the structure, capacitive plates and the comb stators to the electrical connector pads. In step 5, the silicon wafer is anodically bonded to the Pyrex wafer at the mesas. In step 6 the wafer is cut with a saw along outlines (streets) that separate devices. Each device is then EDP (Ethylene-Diamene-Pyrocatechol) etched to remove the silicon, leaving behind epitaxial devices with movable parts. The thickness of the devices is equal to the epitaxial thickness minus the mesa thickness, approximately 40 microns for the present devices. A conceptual side view of the finished device is shown in FIG. 12.

Advantages/Disadvantages of DWP

DWP has several advantages:
devices are made of one material (doped silicon) for greater thermal stability,
Pyrex serves as a robust substrate since it can be made as thick as desired,
multiple devices can be fabricated on the same Pyrex substrate, while making them physically separate,
thicker doped silicon devices can be made subject to the epitaxial process,
the process is a relatively low-temperature process, thereby generating low internal stresses.

The disadvantages of DWP are not limiting, but can contribute to cost of fabrication and greater design complication. They include:
epitaxial growth limits the device thickness and introduces stresses,
chemical etching of most of the silicon wafer by EDP,
induced stresses from differential expansion of the silicon and Pyrex from the anodic bonding elevated temperature, and
reactive ion etching produces some tapering which makes it difficult to attain a desired resonant frequency.

A particularly critical requirement is the formation of flexures with precise geometry having a rectangular cross-section. A small variation in the wall verticality can greatly affect the stiffness and hence the dynamics. A conical cross-section would also have the effect of changing the rotation axis of the GM, and perhaps the orthogonality between the DM and GM axes. This misalignment leads to "quadrature error" in gyroscopes.

Process Modification

A process modification is to replace the Pyrex substrate with silicon for example. To enable anodic bonding a Pyrex-like film can be deposited onto the silicon substrate, where the bonding is to occur with the epitaxial silicon wafer.

CIRCULAR G2-GYROSCOPE EMBODIMENT

Figure 13:
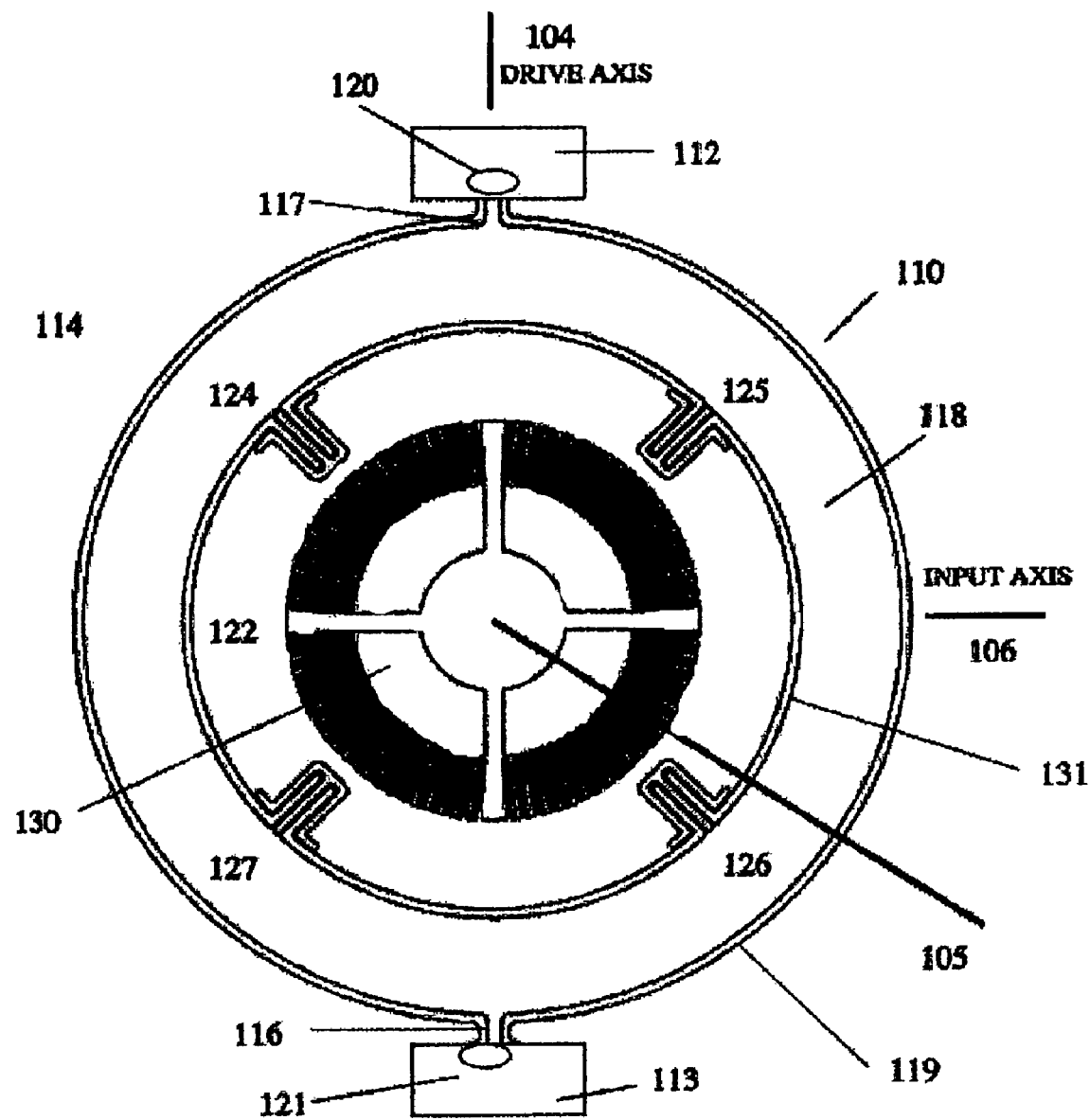
FIG. 13 is a top view of another embodiment of the inventive G2-Gyroscope mechanical design.

Mechanical Design of the Circular G2-Gyroscope The mechanical design of a second preferred embodiment of the inventive G2-Gyroscope 110 is shown in FIG. 13. The rectangular shapes on each end are bonding pads 112, 113 used to bond the device to the Pyrex substrate 114. Two torsional flexures 116, 117 connect the Drive Member 118 to the bonding pads. The flexures are stress-relieved by the oval cutouts 120, 121 in the bonding pads. The annular shape of the DM 118, defined by its circular outer perimeter 119 and circular inner perimeter 131, allows the placement of sufficiently large capacitive plates underneath for actuation. Sense plates are used to measure the motion of the DM. The Gyro Member (GM) 122 is an annular disk connected to the DM with four W-shaped flexures 124, 125, 126, 127; other types, quantities and locations of radial flexures can be used. The radial alignment between the flexures along diagonals across the DM makes a symmetric arrangement with each flexure intended to experience the equivalent stress. Other angular spacings among the radial flexures are also possible.

The working gap between the gyro structure and the Pyrex substrate is 10 microns but the gap used depends on several factors: geometry, actuation capacity, sensitivity, and fabrication constraints. The gap is fabricated by etching a well in the silicon and a well in the Pyrex.

The use of Pyrex is dependent on the need to anodically bond epitaxial silicon to a substrate as described above in the DWP section. Other processes are possible. Pyrex also serves as an electrical insulator between the mechanical device, (which is connected to electrical ground), the rotary comb stators of the Gyro Member and the actuation and sense plates of the DM.

It is preferred for the device to be monolithic for mechanical stability and to connect it to electrical ground.

The gyro is driven by actuation of the DM about the Drive Axis 104. The Output Axis 105 is normal to the plane of the DM. The Input Axis 106 is orthogonal to the other two axes.

Metallization Design of the Circular G2-Gyroscope

Figure 14:
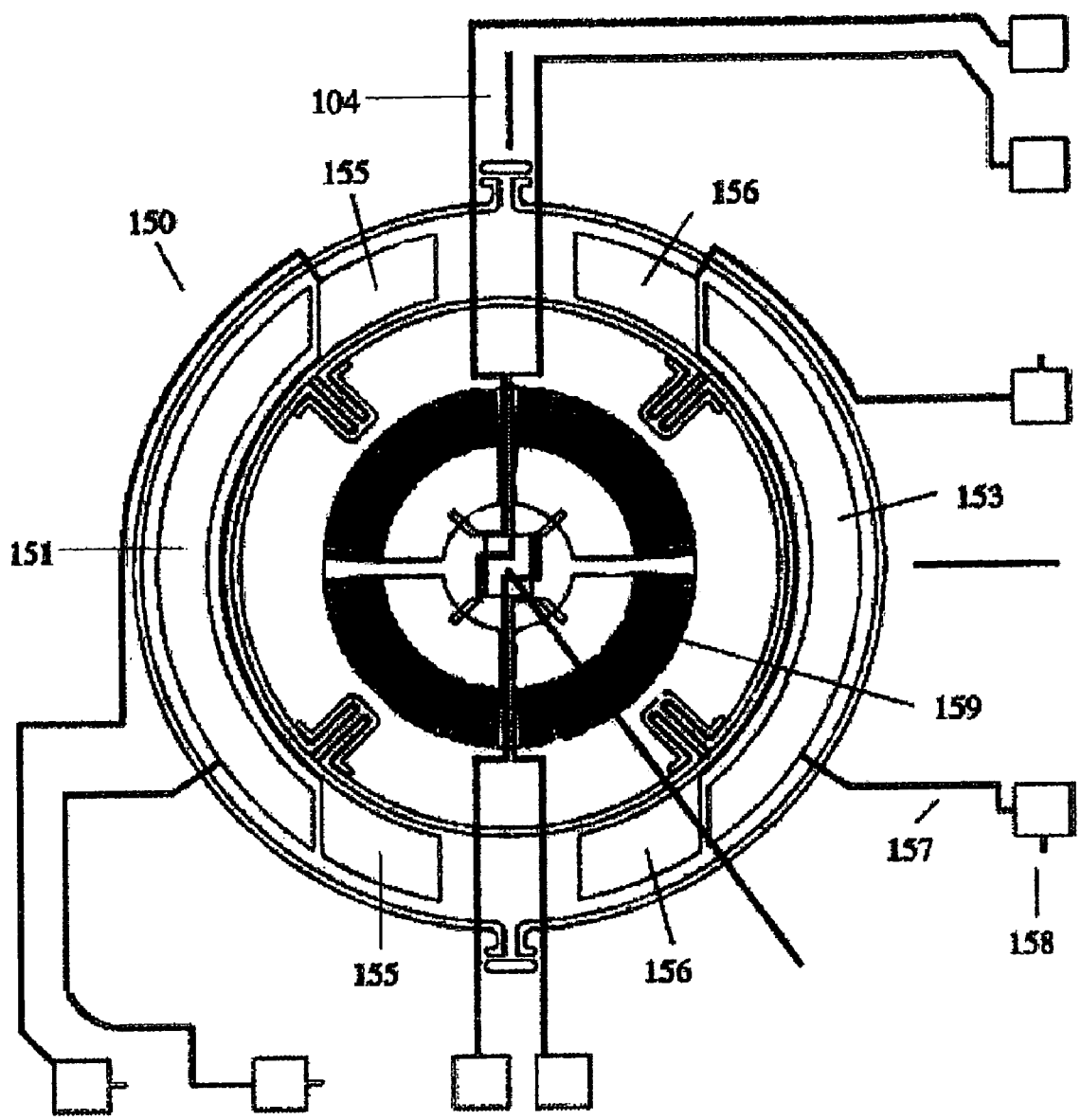
FIG. 14 is a schematic representation of one embodiment of the G2-Gyro metallization design for the embodiment of FIG. 13.

One metallization design 150 is shown in FIG. 14. It consists of capacitive plates, conductor traces and electrical connector pads. Annular section shaped capacitive actuator plate 151 is located under the part of the DM located on the left side of the Drive Axis 104. Annular section shaped capacitive actuator plate 153 is located on the right side. Drive voltages are applied to the actuator plates to predominantly pull down on one side of the DM during the first half of the drive cycle and to predominantly pull down on the other side of the DM during the second half of the drive cycle. The result is an oscillatory motion of the DM about the Drive Axis. The sensing of the DM motion is accomplished with two sets of capacitive plates 155, 156; the plates of each set are connected by a trace. The signals of each set are connected differentially to obtain one DM pick-off signal that is doubled and with common mode noise that is subtracted, since for any motion, the gap for one increases and the gap for the other decreases.

Trace 157 connects capacitive plate 153 to electrical connector pad 158, for example. Other traces are also shown.

The four stators of the rotary comb 159 are connected electrically with traces (not shown) that are crimped between the silicon stator bonding pads and Pyrex substrate during anodic bonding. The gyro silicon structure is connected to electrical ground (not shown) by crimping a trace under at least one bonding pad during anodic bonding.

Second Metallization Design for the G2-Gyroscope

Figure 15:
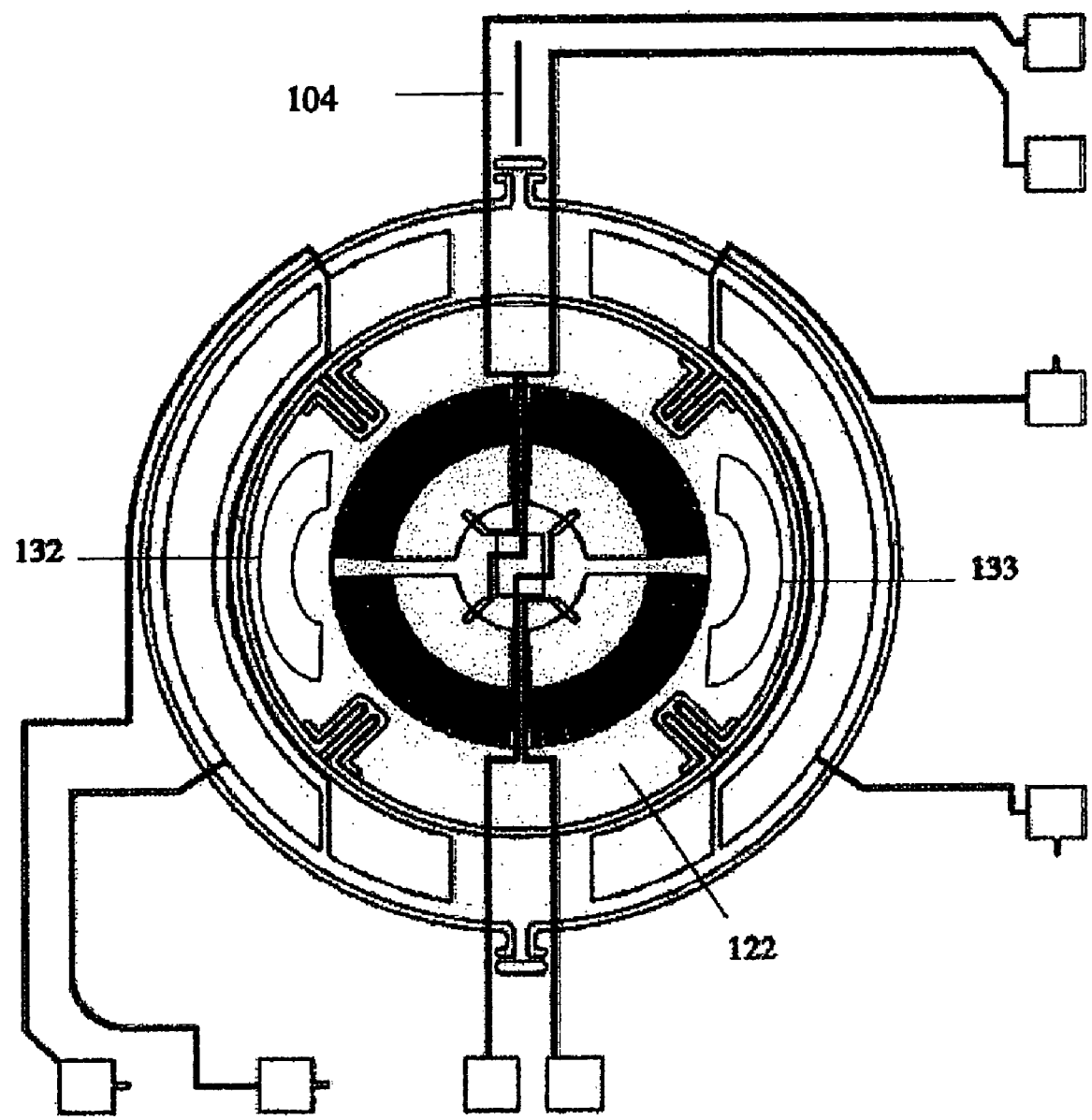
FIG. 15 is a schematic representation of a second embodiment of the G2-Gyro metallization design for the embodiment of FIG. 13, with an additional set of capacitive pick-off plates.

For this second metallization design, capacitive pick-off plates 132, 133 are added under the Gyro Member 122 as shown in FIG. 15, one on either side of the Drive Axis 104. The reason for this placement is to measure the angular motion of the GM about the Drive Axis directly because the GM motion about the Output Axis (output of the gyro) is directly related to it. These added plates are needed for the case where the GM motion about the Drive Axis is not rigid with respect to the motion of the Drive Member and a relative motion results. This effect can be caused by softness in the radial flexures that connect the GM to the DM. By using the signals from plates 132 and 133, a reference waveform with the correct phase can be constructed for the demodulation of the gyro signal.

G2-Gyroscope with Active Quadrature Suppression

The quadrature signal is an oscillatory signal of the motion of the Gyro Member about the Output Axis in the absence of rotation rate input about the gyro Input Axis. It arises from mechanical coupling between the DM and Gyro Member as the DM oscillates about the Drive Axis. The source of the coupling can be misalignment between the Drive and Output Axes or the reaction of the GM radial flexures that connect the Gyro Member to the DM, if they are not sufficiently rigid. In the case of a flexure that is stiff to relative motion between the DM and Gyro Member, while the two are driven about the Drive Axis, the quadrature does not occur. Unfortunately such a flexure may be too stiff thereby driving its natural frequency too high relative to what is possible for the DM natural frequency. Recall that the drive frequency and output frequency need to be within a delta frequency separation, which is related to performance. A best design can minimize the quadrature but not eliminate it without reducing the sensitivity of the gyro due to the increased delta frequency.

Fortunately, the quadrature signal is always 90 degrees of phase separated from the gyro signal. Therefore by demodulating the gyro signal with a reference waveform constructed from the sensed GM motion about the Drive Axis, the quadrature component is detected and by phase shifting the reference waveform by 90 degrees, the gyro signal is obtained. Because the gyro signal and quadrature signal can be separated in this way, the quadrature signal can be acted upon without affecting the gyro signal. The isolated quadrature signal can now be used in a control-loop to counter the coupled motion of the Gyro Member by actuating the GM with the rotary comb to eliminate the GM quadrature motion.

Figure 16:
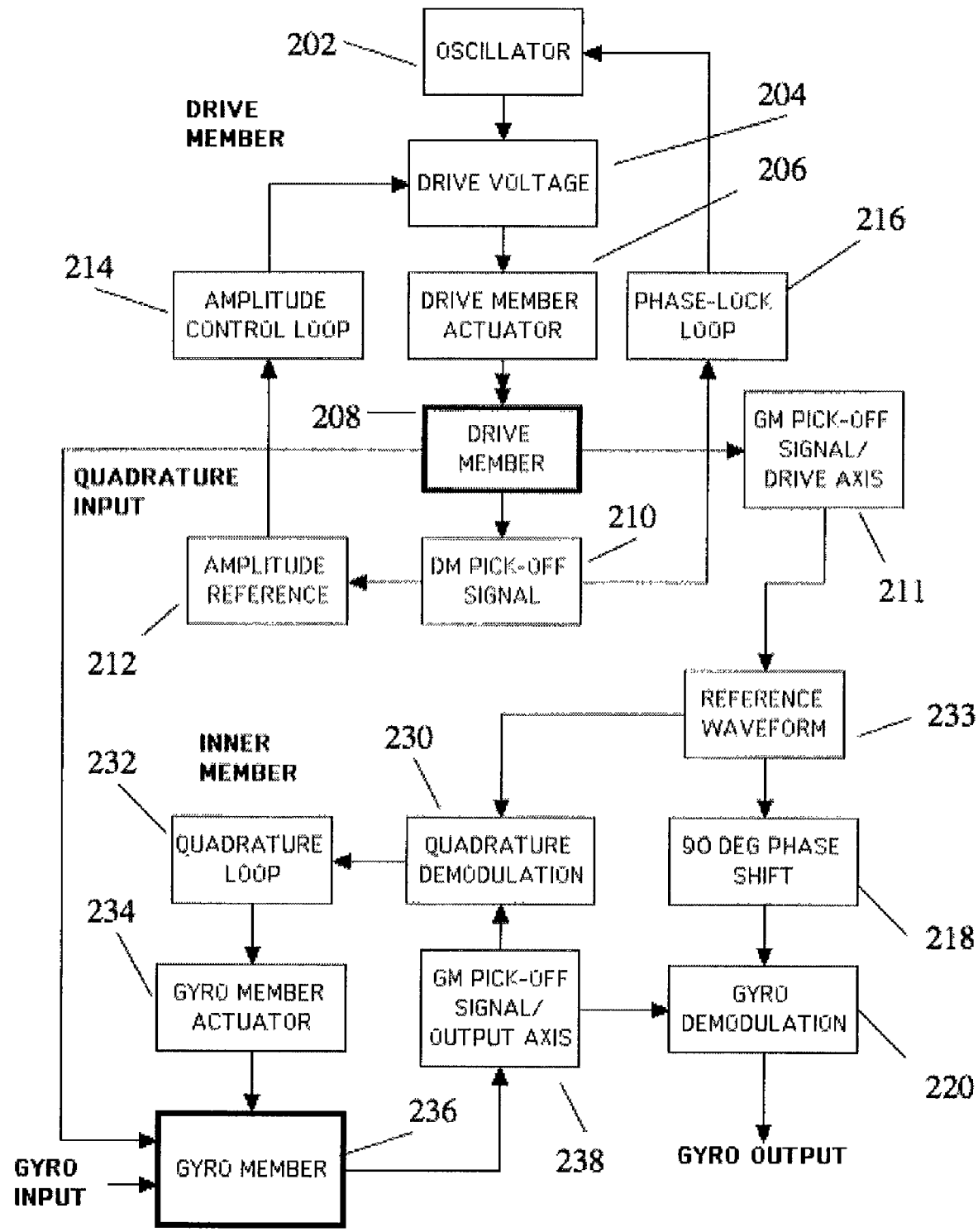
FIG. 16 is a schematic diagram of the preferred electronics for operation of the inventive G2-Gyroscope with inclusion of a quadrature suppression loop.

The electronics block diagram of FIG. 16 is used to describe the embodiment of the G2-Gyro with quadrature control. A voltage-controlled oscillator 202 generates the DM AC drive frequency. A drive voltage 204 containing a DC value plus an AC amplitude (where the amplitude is less than the DC value) is applied to the capacitive Drive Member Actuator 206 to drive the DM 208. A DM pick-off signal 210, obtained with sense plates under the DM is used to sense the Drive Member motion about the Drive Axis. The DM signal is used in an Amplitude Control Loop 212, 214 to maintain the DM angular amplitude constant. The feedback parameter is generated by comparing the DM signal to a reference voltage 212. The DM signal is also used in a Phase-Lock Loop 216 to maintain the oscillator centered with the DM natural frequency (includes the DM plus IM inertia about the Drive Axis since they are connected), thereby operating at resonance to minimize power. The Gyro Member signal about the Drive Axis is obtained with pick-off 211. The signal is used to construct reference waveforms for demodulating the quadrature and rotation rate signal components of the Gyro Member output signal.

The gyro Input is rotation rate about the gyro Input Axis. The gyro response to input is the oscillation of the Gyro Member 236 about the Output Axis at the drive frequency. The signal is obtained with the GM pick-off 238, which uses the capacitive rotary comb. The pick-off signal, however, also contains the quadrature component. By using the reference waveform 233, the quadrature signal is demodulated 230 to a DC value, which is used in the Quadrature Loop 232 to generate a voltage to be applied to the Gyro Member rotary comb actuator 234 to cancel the quadrature motion of the Gyro Member 236. By phase shifting the reference waveform 233 by 90 degrees of phase 218, the gyro response of the Gyro Member signal is demodulated 220 to a DC value. By continuously monitoring the quadrature component and cancelling it, only the gyro response signal remains to obtain the gyro output. Practically some quadrature will remain. It will be important to maintain the phase of the reference waveform stable to prevent leakage of the quadrature signal into the gyro output.

If the G2-Gyro embodiment does not use GM sense plates, then the DM pick-off signal is used to construct the reference waveform.

There are two actuator options for actuating the Gyro Member about the Output Axis. One option is to separate the four quadrants of the Gyro Member rotary comb so that one set of two neighboring quadrants is used for the pick-off for sensing the motion of the Gyro Member and the other set of two neighboring quadrants is used for actuation of the Gyro Member about the Output Axis. The second option is to apply the actuator voltage to the four quadrants to cancel the quadrature motion while simultaneously using the four quadrants for sensing. The reason for doubling the functionality of the same component in the second option is that the two operations are conducted at very different frequencies: the sensing function requires excitation voltages having frequencies at hundreds of kHz while actuation is to be conducted at gyro operation frequencies typically less than 10 kHz. In any case, there would be, by design, a large difference between the two frequencies.

Figure 17:
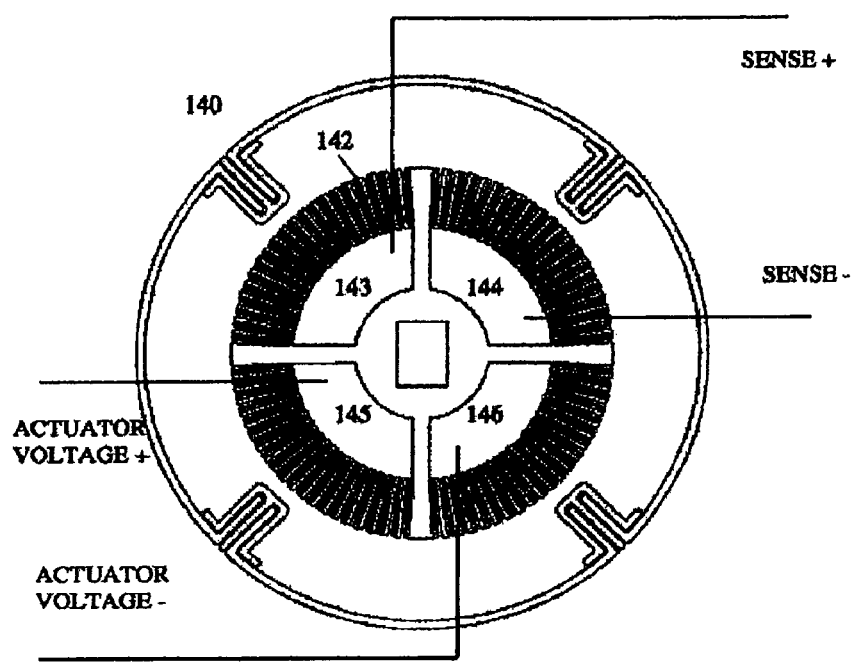
FIG. 17 is a close up view of one embodiment of the rotary comb design of the gyro of FIGS. 3 and 13 for implementing separate pick-off and actuator functions.

The first actuator option is shown in FIG. 17. The rotary comb 140 contains a single rotor 142 that is connected to the Gyro Member and four stators 143-146 connected to the Pyrex substrate. For sensing the Gyro Member output oscillation, the output circuit is connected to stators 143 and 144. For actuating the Gyro Member, an actuator voltage is applied to stators 145 and 146. The actuation voltage contains DC plus AC components, where the AC amplitude is less than the DC value. The reason for the DC is to generate a counter-torque at the same frequency. Without the DC value, the capacitive combs would generate a counter-torque at twice the frequency instead. The voltages applied to the two stators have AC components that are 180 degrees of phase with each other.

Figure 18:
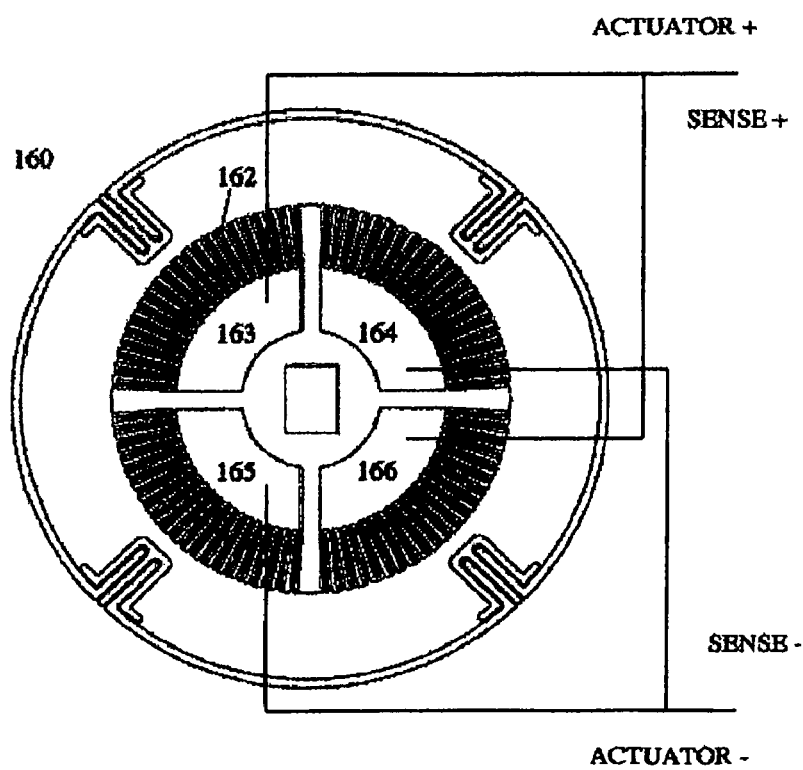
FIG. 18 is a close up view of a second embodiment of the rotary comb design of the gyro of FIGS. 3 and 13 for implementing separate pick-off and actuator functions.

The second actuator option is shown in FIG. 18. The rotary comb 160 contains a single rotor 162 that is connected to the Gyro Member and four stators 163-166 connected to the Pyrex substrate. For sensing the Gyro Member oscillation, one branch of the output circuit is connected to the connected stators 163 and 164 and the second branch to the connected stators 165 and 166. The two sums become the plus and minus signals that are then differenced in the differential mode of operation. For actuation of the Gyro Member, one actuation voltage is applied to the connected stators 163 and 164. A second voltage having the AC component shifted by 180 degrees of phase is applied to the connected stators 165 and 166. This actuation mode is essentially push-pull.

Input Axis Alignment Control of the G2-Gyroscope

The Input Axis (IA) is in the plane of the gyro and orthogonal to the Drive Axis. When the Drive Member is oscillated about the Drive Axis, the Input Axis is oscillated out of the plane by the DM oscillation angle, which is small. And, because the oscillation frequency is high it does not affect the operation of the gyro output because it is not detectable because the gyro bandwidth is much smaller than the oscillation frequency. This alignment control applies to DC rotation of the Input Axis which is in the plane of the Drive Member and Gyro Member in relation to the substrate. A rotation can occur due to stress, temperature effects and, or certain vehicle maneuvers.

Figure 19:
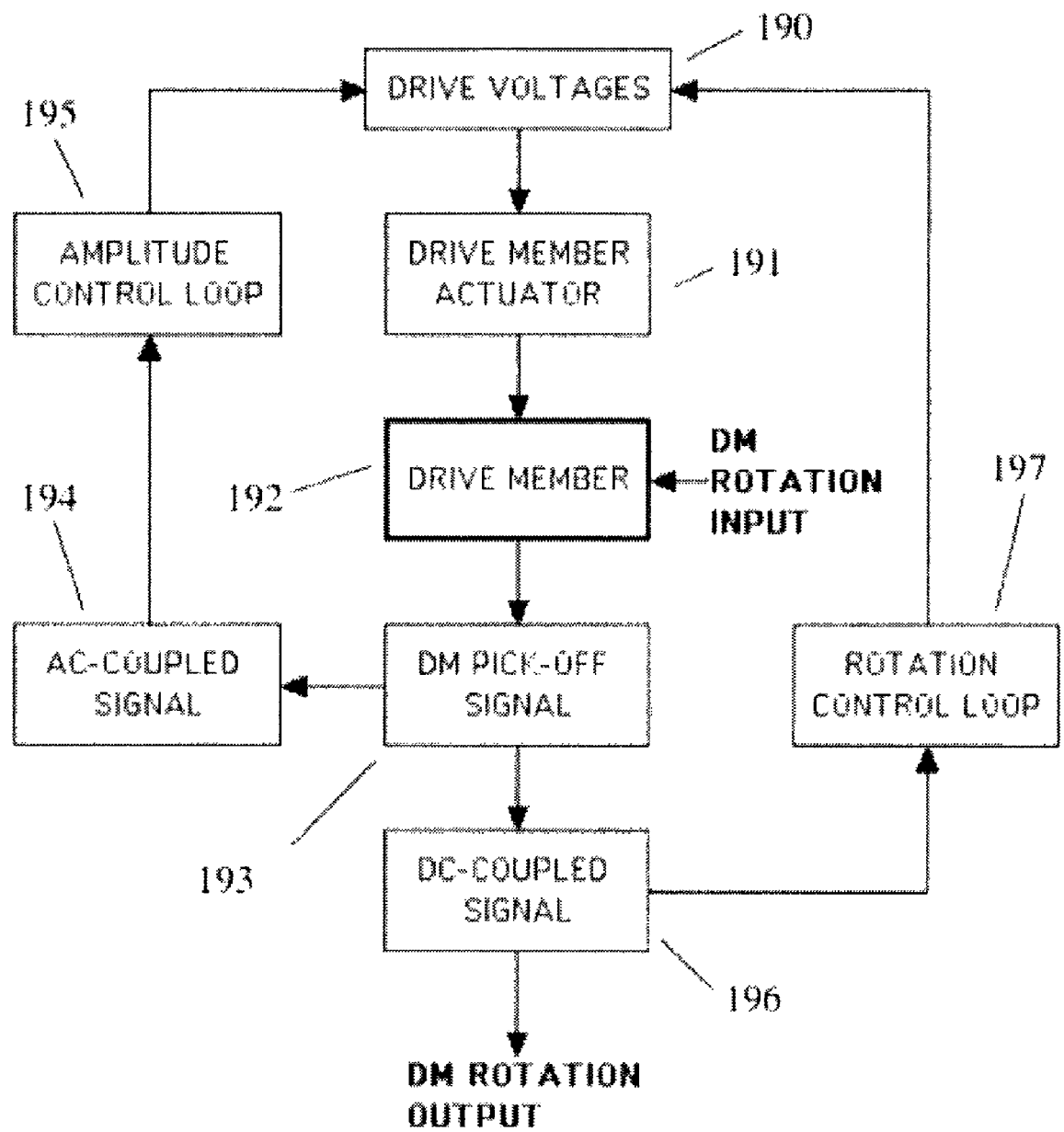
FIG. 19 is a schematic diagram of the preferred electronics for operation of the inventive G2-Gyroscope with inclusion of an Input Axis rotation control loop.

The IA alignment embodiment for the G2-Gyroscope is described with FIG. 19. It also applies to the G2-Out Gyroscope. The phase-lock loop is not included and is considered to be in operation. Two drive voltages 190 each containing DC plus AC components are applied to the Drive Member actuator 191. Both use the same DC value. The AC signal of one drive voltage is 180 degrees phase shifted from the second. The AC amplitude is smaller than the DC value. The purpose is to predominantly pull with one set of Drive Member actuator plates located about one side of the Drive Axis during the first 180 degree cycle of the applied drive voltages and to predominantly pull with the second set of Drive Member actuator plates located about the other side of the Drive Axis during the second 180 degree cycle. With this set-up the Drive Member 192 is oscillated at the AC frequency in essentially push-pull mode.

The DM pick-off uses the DM capacitive plates to obtain a signal 193 related to the oscillation of the DM. In the case where the IA, or DM, is parallel to the substrate, the separate DM sense plates generate signals that will contain a DC component due to the mean position and an AC component due to the oscillation. The AC components are 180 degrees out of phase. The DC components are equal because the IA rotation angle is zero in this case. When differenced, the DC signals zero and the two AC signals add. The AC signals are used for developing the demodulation reference waveform, amplitude loop and phase-lock loop.

In the case of IA rotation, the two DM sense plates generate signals with the same AC signals but different DC values because of the rotation mean angle position of the DM relative to the plates; one set of plates is closer to the substrate than the other. When the two signals are differenced, the AC components will add as before, but the DC value will be non-zero and its sign will indicate the rotation direction. By AC-coupling the total signal 194, the value needed for the control loop 195 is obtained, the output of which is to modify the drive voltages. By DC-coupling the total signal, the DC component signal 196 is obtained. This value is the feedback parameter for the rotation control loop 197.

To apply a counter-torque to the Drive Member for a zero DM rotation output, the drive voltages are modified either by increasing the DC value for one actuator plate and decreasing the DC value of the other while keeping the AC components the same, or keeping the DC components the same and varying the AC component by increasing the amplitude to one actuator plate and decreasing the amplitude to the other.

Derivation of the Equation of Motion

The analysis prescribed by J. S. Ausman (G. R. Pitman, Jr., Editor, *Inertial Guidance*, University of California Engineering and Physical Sciences Extension Series, J. Wiley and Sons, Inc., New York, 1962, J. S. Ausman, ch. 3) for the gimbal structure of the Single-Degree-of-Freedom Gyroscope is applicable to the common structure of the G2-Gyro.

The fundamental equation applied is that the rate of change of angular momentum is equal to the applied torque:

$$\overline{L} = \left(\frac{d\overline{H}}{dt}\right)_I \quad (15)$$

This is Newton's second law in rotational form. In equation (15) $(d\overline{H}/dt)_I$ is the time rate of change of $\overline{H}$, the angular momentum vector, with respect to inertial space, while $\overline{L}$ represents the applied torque vector. When equation (15) is applied to the GM we get $$\left(\frac{\overline{dH_{GM}}}{dt}\right)_I = \left(\frac{\overline{dH_{GM}}}{dt}\right)_{GM} + \overline{\omega} \times \overline{H_{GM}} \quad (16)$$

$$= \overline{L_{GM}}$$

where $\overline{H_{GM}}$ is the angular momentum of the GM, $$\left(\frac{\overline{dH_{GM}}}{dt}\right)_{GM}$$

is the time derivative of $\overline{H_{GM}}$ relative to the s, i, o coordinate system, and $\overline{\omega}$ is the angular velocity of the GM or s, i, o coordinate system in inertial space.

The GM angular momentum, $\overline{H_{GM}}$, is given by $$\overline{H_{GM}} = \overline{\overline{I_{GM}}} \cdot \overline{\omega} \quad (17)$$

where $\hat{s}$ is a unit vector in the s direction. $\overline{\overline{I_{GM}}}$ is the moment of inertia tensor of the GM.

Calculate $\overline{\omega}$

Since the GM is mounted to the DM, which is mounted to the case, the angular velocity of the GM in inertial space is given by the angular velocity of the GM gimbal, measurable relative to the DM, plus the motion of the DM, measurable relative to the case, plus the motion of the case. This is expressible as a vector sum of the separate angular velocities $$\overline{\omega} = \overline{\omega}_{s,i,o} + \overrightarrow{\omega}_{x,y,z} + \overline{\omega}_{a,b,c} \quad (18)$$

$$= \dot{\vartheta}\hat{o} + \dot{\phi}_x\hat{x} + \dot{\phi}_y\hat{y} + \dot{\phi}_z\hat{z} + \dot{\gamma}_a\hat{a} + \dot{\gamma}_b\hat{b} + \dot{\gamma}_c\hat{c}$$

where $\vartheta$, $\phi$, $\gamma$ are angles of rotation for the GM, DM and case (or vehicle) axes, respectively. $\dot{\vartheta}$ relates that the motion of the GM is only about the o-axis. Further, we expect that the motion of the DM will only be about the y-axis, therefore, $$\overline{\omega} = \dot{\vartheta}\hat{o} + \dot{\phi}_y\hat{y} + \dot{\gamma}_a\hat{a} + \dot{\gamma}_b\hat{b} + \dot{\gamma}_c\hat{c} \quad (19)$$

The motion of the vehicle is unconstrained in inertial space.

Since we are interested in the motion of the GM in the s,i,o frame, we need to convert the latter terms in equation (19). We know the relationship between the s,i,o and x,y,z frames is a rotation about the o-axis. We apply the rotational transformation:

$$\hat{x} = \hat{s}\cos\vartheta - \hat{i}\sin\vartheta \approx \hat{s} - \hat{i}\vartheta$$

$$\hat{y} = \hat{i}\cos\vartheta + \hat{s}\sin\vartheta \approx \hat{i} + \hat{s}\vartheta$$

$$\hat{z} = \hat{o} \quad (20)$$

Since the GM is held at null, only small motions need to be considered, hence the small angle approximation is used.

We also know that the DM can only rotate about the y-axis, therefore the two axes are related by the rotational transformation:

$$\hat{a} = \hat{x}\cos\phi - \hat{z}\sin\phi \approx \hat{x} - \hat{z}\phi$$

$$\hat{b} = \hat{y}$$

$$\hat{c} = \hat{x}\sin\phi + \hat{z}\cos\phi \approx \hat{x}\phi + \hat{z} \quad (21)$$

The DM motion is also small hence the small angle approximation is again used. Substituting the rotations (20) and (21) into (19), we get $$\overline{\omega} = \omega_s\hat{s} + \omega_i\hat{i} + \omega_o\hat{o} \quad (22)$$

where $$\omega_s = (\dot{\vartheta}\dot{\phi}_y + \dot{\gamma}_a + \dot{\vartheta}\dot{\gamma}_b + \dot{\phi}\dot{\gamma}_c), \omega_i = (\dot{\phi}_y - \dot{\vartheta}\dot{\gamma}_a + \dot{\gamma}_b - \dot{\vartheta}\dot{\phi}\dot{\gamma}_c), \omega_c = (\dot{\vartheta} - \dot{\phi}\dot{\gamma}_a + \dot{\gamma}_c) \quad (23)$$

Calculate $\overline{H}_{GM}$

The moment of inertia tensor for the GM is given by $$\overline{\overline{I}} = \begin{pmatrix} I_s & 0 & 0 \\ 0 & I_i & 0 \\ 0 & 0 & I_o \end{pmatrix} \quad (24)$$

assuming s, i, o are the principal axes of inertia for the GM. If s, i, o are not principal axes of inertia, it will generally be most convenient first to compute the vector components of $\overline{\overline{I}} \cdot \overline{\omega}$ along a set of principal axes and then to transform the vector $\overline{\overline{I}} \cdot \overline{\omega}$ into the s, i, o coordinate system. We assume that our designs have the appropriate symmetries.

Multiplying equation (22) by the moment of inertia tensor (24), and substituting into equation (17) gives $$\overline{H_{GM}} = \overline{\overline{I}} \cdot \overline{\omega} \quad (25)$$

$$= \begin{pmatrix} I_s & 0 & 0 \\ 0 & I_i & 0 \\ 0 & 0 & I_o \end{pmatrix} \cdot (\omega_s\hat{s} + \omega_i\hat{i} + \omega_o\hat{o})$$

$$= I_s\omega_s\hat{s} + I_i\omega_i\hat{i} + I_o\omega_o\hat{o}$$

$$= H_{IMs}\hat{s} + H_{IMi}\hat{i} + H_{IMo}\hat{o} \quad (26)$$

where (27)

$$H_{IMs} = I_s\omega_s, H_{IMi} = I_i\omega_i, H_{IMo} = I_o\omega_o$$

Calculate $\overline{\omega} \times \overline{H}_{GM}$

The expression $\overline{\omega} \times \overline{H_{GM}}$ is given by $$\overline{\omega} \times \overline{H_{GM}} = \begin{vmatrix} \hat{s} & \hat{i} & \hat{o} \\ \omega_s & \omega_i & \omega_o \\ H_{GMs} & H_{GMi} & H_{GMo} \end{vmatrix} \quad (28)$$

$$= (\omega_i H_{GMo} - \omega_o H_{GMi})\hat{s} - (\omega_s H_{GMo} - \omega_o H_{GMs})\hat{i} + (\omega_s H_{GMi} - \omega_i H_{GMs})\hat{o}$$

We will restrict ourselves to the o-axis solution since we will assume that motions of the GM about the other axes do not occur.

$$(\overline{\omega} \times \overline{H}_{GM})_o = \omega_s H_{GMi} - \omega_i H_{GMs} \quad (29)$$

$$= \omega_s I_i \omega_i - \omega_i I_s \omega_s$$

$$= \omega_s \omega_i I_i - \omega_i \omega_s I_s$$

$$= (I_i - I_s)\omega_s \omega_i$$

Calculate $$\frac{dH_{GMo}}{dt} + (\overline{\omega} \times \overline{H}_{GM})_o$$

to get the equation of motion.

$$\frac{dH_{GMo}}{dt} + (\omega \times H_{GM})_o = I_o \dot{\omega}_o + (I_i - I_s)\omega_s \omega_i \quad (30)$$

Substituting for $\omega_o$, $\omega_i$, $\omega_s$ and adding damping and spring terms to the motion of the GM, as well as the pendulous torque, we get the full GM Equation of Motion. The variables for the angles can change in rotational or oscillatory mode or both.

$$I_{GMo}\ddot{\vartheta} + D_{GM}\dot{\vartheta} + \quad (31)$$
$$\left[ K_{GM} + (\dot{\phi}_y^2 + \dot{\phi}_y\dot{\gamma}_b - \dot{\gamma}_a^2 - \dot{\phi}\dot{\gamma}_a\dot{\gamma}_c + \dot{\phi}_y\dot{\gamma}_b + \dot{\gamma}_b^2 - \dot{\phi}\dot{\gamma}_a\dot{\gamma}_c - \phi^2\dot{\gamma}_c^2)\Delta I \right]$$
$$\vartheta - (\dot{\phi}_y\gamma_a + \phi\dot{\phi}_y\gamma_c + \dot{\gamma}_a\gamma_b + \phi\dot{\gamma}_b\gamma_c)\vartheta^2 =$$
$$I_{GMo}(\phi\ddot{\gamma}_a + \dot{\phi}\dot{\gamma}_a - \ddot{\gamma}_c) - \Delta I(\dot{\phi}_y\gamma_a + \dot{\gamma}_a\gamma_b + \phi\dot{\phi}_y\gamma_c + \phi\dot{\gamma}_b\gamma_c)$$

Note that: $\phi = \phi_y$, $\Delta I_{GM} = I_{GMi} - I_{GMs}$ where
  $\vartheta$ GM rotation angle relative to the DM,
  $\phi$ DM rotation angle relative to case,
  $\gamma_a$, $\gamma_b$, $\gamma_c$ case rotation angles.

Making substitutions for $\phi$ and $\dot{\phi} = \omega\tilde{\phi}\cos\omega t$ and $\dot{\gamma} = \Omega_a$, $\dot{\gamma}_b = \Omega_c$, we get the final form for the equation of motion with all the angular rotation dependences.

$$I_{GMo}\ddot{\vartheta} + D_{GM}\dot{\vartheta} + \left[ K_{GM}\left\{ (\Omega_b^2 - \Omega_a^2) + \right. \right. \quad (32)$$
$$\left. \left. \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t \right\} \Delta I \right] \vartheta -$$
$$(\Omega_a\Omega_b + \Omega_a\Omega_c\tilde{\phi}\sin\omega t + \Omega_a\tilde{\phi}\omega\cos\omega t)\vartheta^2 = I_{GMo}\Omega_a\tilde{\phi}\omega\cos\omega t -$$
$$\Delta I(\Omega_a\Omega_b + \Omega_b\Omega_c\tilde{\phi}\sin\omega t + \frac{1}{2}\Omega_c\sin 2\omega t + \Omega_c\tilde{\phi}\omega\cos\omega t)$$

Specific features of the invention are shown in some drawings and not others, but this is not a limitation of the invention, the scope of which is set forth in the following claims.

What is claimed is:

1. A gyroscope that lies generally in a plane, for detecting rotation rate about a gyro input axis that lies in the plane, comprising:
    a substrate defining a top surface;
    spaced bonding pads coupled to the substrate and projecting above the top surface of the substrate;
    a generally planar plate outer member spaced above and essentially parallel to the top surface of the substrate and flexibly coupled to the bonding pads by flexures, such that the outer member is capable of oscillatory motion relative to the substrate and about a drive axis that is in the plane of the outer member and orthogonal to the input axis, the outer member defining a central opening bordered by a generally circular inner perimeter;
    a generally planar plate inner member coplanar with and located within the central opening of the outer member, the inner member flexibly coupled to the outer member such that the inner member is capable of rotary oscillatory motion relative to the outer member about an output axis that is orthogonal to the plane of the members in response to input rotation rate, and such that the inner member will oscillate with the outer member relative to the substrate about the drive axis, as the outer member is oscillated about the drive axis;
    one or more outer member drives for directly oscillating the outer member about the drive axis, and thereby also oscillating the inner member about the drive axis;
    one or more drive axis motion sensors that sense motion of the inner member or the outer member about the drive axis and have an output signal related to the sensed motion; and
    one or more inner member sensors that detect oscillation of the inner member relative to the outer member about the output axis and have an output signal related to the detected oscillation.

2. The gyroscope of claim 1 in which the inner member defines a generally circular outer perimeter.

3. The gyroscope of claim 2 in which the outer member is generally annular.

4. The gyroscope of claim 3 in which the outer member drives comprise partially annular capacitive plates located under and spaced from the outer member on both sides of the drive axis.

5. The gyroscope of claim 4 in which the drive axis motion sensors comprise capacitive plates located under and spaced from the outer member.

6. The gyroscope of claim 4 in which the drive axis motion sensors comprise capacitive plates located under and spaced from the inner member.

7. The gyroscope of claim 1 in which the outer member defines a generally circular outer perimeter.

8. The gyroscope of claim 1 in which the outer member defines a generally rectangular outer perimeter.

9. The gyroscope of claim 1 further comprising one or more inner member drives for oscillating the inner member about the output axis.

10. The gyroscope of claim 9 further comprising a quadrature control loop for driving the inner member so as to decrease quadrature error, the control loop comprising circuitry that demodulates the inner member sensors output signal with the drive axis motion sensors output signal to obtain a quadrature signal, and supplies the quadrature signal to the inner member drives so as to reduce the quadrature error.

11. The gyroscope of claim 10 in which the inner member sensors comprise a multiple sector rotary comb capacitive device comprising sets of mating combs defined by stators coupled to the substrate and rotor coupled to the inner member.

12. The gyroscope of claim 11 in which the inner member drives comprise a plurality of sectors of the rotary comb capacitive device.

13. The gyroscope of claim 12 in which the rotary comb capacitive device comprises four stator sectors that are symmetrically, radially arranged around the output axis and electrically isolated from one another, and a single radial rotor.

14. The gyroscope of claim 13 in which two sectors are used for inner member sensors and two sectors are used for inner member drives.

15. The gyroscope of claim 13 in which all four sectors are used for both inner member sensors and inner member drives.

16. The gyroscope of claim 1 in which the outer member drives comprise capacitive drives.

17. The gyroscope of claim 16 in which there is at least one outer member drive on each side of the drive axis.

18. The gyroscope of claim 17 in which the outer member drives and the drive axis motion sensors each comprise plates on the top surface of the substrate, below and spaced from the outer member and inner member, and in which the outer member drive plates and the drive axis motion sensor plates are electrically isolated from one another.

19. The gyroscope of claim 18 comprising a plurality of drive axis motion sensors, at least one on each side of the drive axis, and in which the difference between the output signals of drive axis motion sensors on opposite sides of the drive axis is used to operate the outer member drives, to control alignment of the input axis.

20. A gyroscope that lies generally in a plane, for detecting rotation rate about a gyro input axis that lies in the plane, comprising:
   a substrate defining a top surface;
   a mounting post coupled to the substrate and projecting above the top surface of the substrate;
   a generally planar plate ring member spaced above and essentially parallel to the top surface of the substrate and defining a central opening, the ring member flexibly coupled to the mounting post by a plurality of radial flexures, such that the post is centrally located within the central opening of the ring member;
   a generally planar plate gyro member located outside of and coplanar with the ring member, the gyro member defining a central opening within which the ring member is located, the gyro member central opening bordered by a generally circular inner perimeter, the gyro member flexibly coupled to the ring member with a pair of colinear torsional flexures such that the gyro member is capable of oscillatory motion relative to the plane of the ring member and relative to the substrate about a drive axis that is in the plane of the gyro member and orthogonal to the input axis, and such that the gyro member will oscillate with the ring member about an output axis that is orthogonal to the plane of the gyro member and the ring member;
   wherein the ring member together with the gyro member is capable of rotary oscillatory motion about the output axis;
   one or more gyro member drives for directly oscillating the gyro member about the drive axis;
   one or more gyro member motion sensors that sense motion of the gyro member about the drive axis and have an output signal related to the sensed motion; and
   one or more oscillation sensors that detect oscillation of the ring member and the gyro member about the output axis and have an output signal related to the detected oscillation.

21. The gyroscope of claim 20 in which the ring member defines a generally circular outer perimeter.

22. The gyroscope of claim 21 in which the gyro member is generally annular.

23. The gyroscope of claim 22 in which the gyro member drives comprise partially annular capacitive plates located under and spaced from the gyro member on both sides of the drive axis.

24. The gyroscope of claim 23 in which the gyro member motion sensors comprise capacitive plates located under and spaced from the gyro member.

25. The gyroscope of claim 20 in which the gyro member defines a generally circular outer perimeter.

26. The gyroscope of claim 20 further comprising one or more ring member drives for oscillating the ring member about the output axis.

27. The gyroscope of claim 26 further comprising a quadrature control loop for driving the ring member so as to decrease quadrature error, the control loop comprising circuitry that demodulates the oscillation sensors output signal with the gyro member motion sensors output signal to obtain a quadrature signal, and supplies the quadrature signal to the ring member drives so as to reduce the quadrature error.

28. The gyroscope of claim 27 in which the oscillation sensors comprise a multiple sector rotary comb capacitive device comprising sets of mating combs defined by stators coupled to the substrate and rotor coupled to the ring member.

29. The gyroscope of claim 28 in which the ring member drives comprise a plurality of sectors of the rotary comb capacitive device.

30. The gyroscope of claim 29 in which the rotary comb capacitive device comprises four stator sectors that are symmetrically, radially arranged around the output axis and electrically isolated from one another, and a single radial rotor.

31. The gyroscope of claim 30 in which two sectors are used for oscillation sensors and two sectors are used for ring member drives.

32. The gyroscope of claim 30 in which all four sectors are used for both oscillation sensors and ring member drives.

33. The gyroscope of claim 20 in which the gyro member drives comprise capacitive drives.

34. The gyroscope of claim 33 in which there is at least one gyro member drive on each side of the drive axis.

35. The gyroscope of claim 34 in which the gyro member drives and the gyro member motion sensors each comprise plates on the top surface of the substrate, below and spaced from the gyro member and the ring member, and in which the gyro member drive plates and the gyro member motion sensor plates are electrically isolated from one another.

36. The gyroscope of claim 35 comprising a plurality of gyro member motion sensors, at least one on each side of the drive axis, and in which the difference between the output signals of gyro member motion sensors on opposite sides of the drive axis is used to operate the gyro member drives, to control alignment of the input axis.

\* \* \* \* \*